United States Patent
Gross et al.

(10) Patent No.: US 10,409,744 B1
(45) Date of Patent: Sep. 10, 2019

(54) LOW-LATENCY WAKE-UP IN A PERIPHERAL DEVICE

(71) Applicant: Amazon Technologies, Inc., Seattle, WA (US)

(72) Inventors: Saar Gross, Binyamina (IL); Said Bshara, Tira (IL); Adi Habusha, Moshav Alonei Abba (IL); Nafea Bshara, San Jose, CA (US); Ronen Shitrit, Kiryat Ata (IL)

(73) Assignee: Amazon Technologies, Inc., Seattle, WA (US)

(*) Notice: Subject to any disclaimer, the term of this patent is extended or adjusted under 35 U.S.C. 154(b) by 270 days.

(21) Appl. No.: 15/251,877

(22) Filed: Aug. 30, 2016

(51) Int. Cl.
| | |
|---|---|
| *G06F 1/32* | (2019.01) |
| *G06F 13/24* | (2006.01) |
| *G06F 13/42* | (2006.01) |
| *G06F 1/3287* | (2019.01) |
| *G06F 1/3206* | (2019.01) |
| *G06F 1/3296* | (2019.01) |
| *G06F 1/3293* | (2019.01) |

(52) U.S. Cl.
CPC ............ *G06F 13/24* (2013.01); *G06F 1/3206* (2013.01); *G06F 1/3287* (2013.01); *G06F 1/3296* (2013.01); *G06F 13/4282* (2013.01); *G06F 1/3293* (2013.01)

(58) Field of Classification Search
CPC ........ G06F 9/4812; G06F 9/4856; G06F 1/32; G06F 1/3206; G06F 1/3203; G06F 1/3243; G06F 1/3287; G06F 1/3293; G06F 1/3296
See application file for complete search history.

(56) References Cited

U.S. PATENT DOCUMENTS

2017/0185533 A1* 6/2017 Rozas ................ G06F 12/1408

* cited by examiner

*Primary Examiner* — Ernest Unelus
(74) *Attorney, Agent, or Firm* — Kilpatrick Townsend & Stockton LLP

(57) ABSTRACT

A processor in a peripheral device can include a wait-for-event mechanism, through which the processor can enter low-power mode and be woken from lower-power mode with an event. Using an event, rather than an interrupt, allows the processor to wake without the latency incurred by an interrupt handling routine. In various implementations, the processor may be configured to execute a sequence of instructions that include a wait-for-event instruction. The wait-for-event instruction can be called when the processor is idle. The wait-for-event instruction may initiate a low-power mode for the processor, wherein the processor suspends executing the sequence of instructions. The processor may further be configured to receive, at an event input, an event signal. The event signal may cause the processor to exit the low-power mode and to resume executing the sequence of instructions from the point at which the processor suspended executing the sequence of instructions.

22 Claims, 8 Drawing Sheets

LOW-LATENCY WAKE-UP IN A PERIPHERAL DEVICE

BACKGROUND

Computing systems generally include peripheral devices. Peripheral devices may be connected to a computing system internally or externally, and typically communicate with a computing system through one or more busses. The manner in which data is transferred on a bus is typically defined by a bus protocol. Examples of bus protocols include the Peripheral Component Interconnect (PCI) family of bus protocols (e.g., PCI, PCI-eXtended (PCI-X), PCI Express (PCIe), PCI derivatives such as Accelerated Graphics Port (AGP), etc.), among others.

Some peripheral devices may include one or more processors integrated into the peripheral devices. For example, a peripheral device configured as a network interface card may include a processor (or processors) to examine and process packets that routine routing operations are unable to handle. As another example, a peripheral device configured as a co-processor card may include processors that provide additional computing resources to a computing system.

Processors often include a low-power, or standby mode. When in low-power mode, a processor may shut down certain operations, such as disabling some parts of the chip or some clock signals. Alternatively or additionally, the processor may reduce some clock frequencies. Thus, when in low-power mode, a processor may reduce its power consumption.

BRIEF DESCRIPTION OF THE DRAWINGS

Various embodiments in accordance with the present disclosure will be described with reference to the drawings, in which:

FIG. 4 further illustrates an example where the peripheral device receives a read transaction.

FIG. 5 further illustrates an example where the peripheral device receives a write transaction;

DETAILED DESCRIPTION

Figure 1:
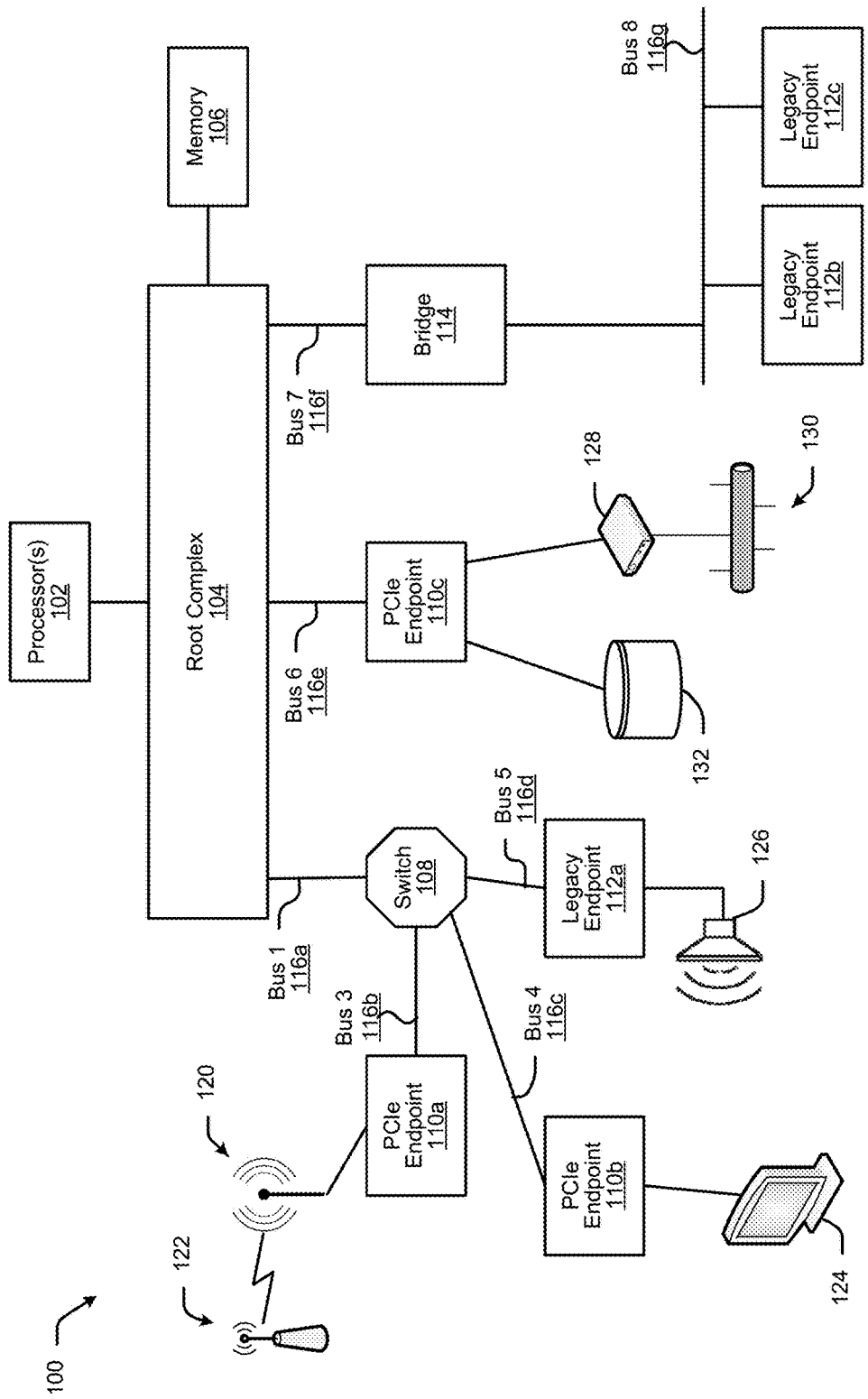
FIG. 1 illustrates an example of a computing system that includes multiple peripheral devices.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Computing systems generally include peripheral devices. A peripheral device is a device that can extend, adapt, and/or modify the functionality of the computing system. For example, peripheral devices may provide storage, network connectivity, and/or audio and video support to a computing system. Peripheral devices may be connected to a computing system internally or externally, and typically communicate with a computing system through one or more busses. The manner in which data is transferred on a bus is typically defined by a bus protocol. Examples of bus protocols include the Peripheral Component Interconnect (PCI) family of bus protocols (e.g., PCI, PCI-eXtended (PCI-X), PCI Express (PCIe), PCI derivatives such as Accelerated Graphics Port (AGP), etc.), among others.

Some peripheral devices may include one or more processors integrated into the peripheral devices. For example, a peripheral device configured as a network interface card may include a processor (or processors) to examine and process packets that routine routing operations are unable to handle. As another example, a peripheral device configured as a co-processor card may include processors that provide additional computing resources to a computing system.

Processors typically consume a large amount of power. For example, processors used in general-purpose computers, such as desktop and laptop computers, which tend to be very complex and run at very high clock speeds, can consume a few watts to hundreds of watts of power. Processors in a peripheral device, however, are likely to be idle when the peripheral device is not in use. But even when idle, the clocks in a processor are still running, and so the processor may still be consuming a large amount of power.

Processors thus often include a low-power, or standby mode. When in low-power mode, a processor may shut down certain operations, such as disabling some parts of the chip or some clock signals. Alternatively or additionally, the processor may reduce some clock frequencies.

Various processors may have different mechanisms for waking a processor that is in low-power mode. For example, a processor may include a wait-for-interrupt instruction. When the processor executes the wait-for-interrupt instruction, the processor may enter low-power mode, and can be woken upon receipt of an interrupt. An interrupt is a special signal to a processor that causes the processor to stop whatever it was doing in order to handle the interrupt. Typically, the processor may be configured with a set of instructions for handling interrupts, where the set of instructions are usually referred to as an interrupt handler or an interrupt service routine. Handling an interrupt may include issuing one or more read transactions to determine what caused the interrupt and/or the nature of the interrupt. Handling the interrupt may further include taking some action (e.g. fixing an error, resetting some logic, transferring data, etc.).

Using an interrupt, however, to wake a processor that is in low-power mode may add undesirable latency to the wake-up process. An interrupt handler routine may take several microseconds to execute. To avoid this cost, processors that have only a wait-for-interrupt mechanism to wake the processor from a low-power mode may be configured to enter low-power mode less frequently.

Some processors have other mechanisms for entering and waking from low-power mode. For example, some processors include a wait-for-event mechanism. In some cases, an event is also a signal to the processor, but unlike an interrupt signal, the processor does not execute "event handler" instructions upon receiving an event signal. Instead, the processor simply resumes executing instructions at the point at which it received the wait-for-event instruction. For example, assume that a processor is scheduled to execute instructions A, B, C, D, E, F, and G. Further, assume that after executing instruction C, the processor executes a wait-for-event instruction, and, as a result, enters low-power, or standby mode. Upon receiving an event signal, the processor would exit low-power mode, and start executing the scheduled instructions, starting with instruction D. Thus a wait-for-event mechanism adds little latency to the wake-up process for a processor in low-power mode. A wait-for-event mechanism could also enable a processor to be put into low-power mode more often.

In a multi-processor system, a wait-for-event instruction is typically used in a spinlock loop. A spinlock loop may occur when more than one processor attempts to access the same shared resource: one processor will gain access to the shared resource while the remaining processors will enter a spinlock loop while waiting for the resource to be freed. To save power, a wait-for-event instruction can be put into the loop, so that instead of looping and consuming power, the processor that is looping goes into low-power mode. Once the processor that is using the shared resource is done with the resource, it can signal an event. This event signal will wake the processors that are waiting for the resource, and another processor will gain access to the resource.

Examples of processors that include both wait-for-interrupt and wait-for-event mechanisms include processors that implement the ARM® instruction set.

In various implementations, a wait-for-event mechanism can also be used to put processors in peripheral devices into a low-power mode. In a peripheral device, wait-for-event can be used to put a processor in low-power mode not just when the processor enters a spinlock loop, but also any time the processor is idle or is expected to be idle. In various implementations, a peripheral device may include a management module that is able to detect when a processor in the peripheral device is idle. When the processor is idle or is expected to be idle, the management module may instruct the processor to wait for an event and enter low-power mode.

The management module may also have other responsibilities, such as tracking and logging transactions received by the peripheral device. Tracking inbound transactions may assist the management module in determining whether a processor is idle. Furthermore, the management module may be better able to determine when a processor is idle than the processor itself, which may not have a view into transactions that are pending for it. When the management module receives an inbound transaction that is to be executed by a processor that is in low-power mode, the management module can signal an event to the processor, causing the processor to quickly exit low-power mode. Once out of low-power mode, the processor can resume executing instructions, including instructions for executing the transaction.

In various implementations, other events can wake a processor on a peripheral device when the processor is in low-power mode. For example, it may be that a second processor on the peripheral device, which is not in low-power mode, needs the services of a processor that is in low-power mode. For example, the processor that is in low-power mode may be a service provider for the second processor. When the second processor needs the services of the processor that is the service provider, the second processor can signal an event, causing the processor that is in low-power mode to wake up and start executing instructions. As another example, an interrupt can also be an event that wakes a processor that is in low-power mode.

Using a wait-for-event mechanism may provide a peripheral device with better control over putting its processors into low-power mode. A wait-for-event mechanism may allow the peripheral device to put a processor into low-power mode whenever the processor is idle. Furthermore, then processor can be woken very quickly, and without the latency that may be added by a mechanism such as a wait-for-interrupt mechanism. Thus, the wait-for-event can provide a low-latency mechanism for waking a processor. With less latency cost in waking a processor, the processor can be put into low-power mode more frequently.

FIG. 1 illustrates an example of a computing system 100 that includes multiple peripheral devices. Peripheral devices may include hardware devices and/or devices that include a combination of hardware and software, which can be attached to a computing system to add functionality to the computing system 100. Examples of peripheral devices include storage devices, displays, speakers, wired and/or wireless network adapters, adapters to provide additional ports to the system (such as serial and/or parallel ports), bridges, hubs, and/or switches that provide ports for additional peripheral devices, and others. Generally, peripheral devices can be connected and disconnected from the computing system to change the functionality of the system. In some cases, the computing system must be powered down for a peripheral device to be added or removed. In other cases, the peripheral device can be attached or removed while the computer system is powered on (often referred to as "hot-swapping" or "hot-plugging").

The example of FIG. 1 illustrates a computing system 100 that includes peripheral devices that implement one or more variations of the Peripheral Component Interconnect (PCI) standard bus protocols. A bus is a communication channel that transfers data within a computing system, or between a computing system and other devices. A standard bus protocol is a data transfer protocol for which a specification has been defined and adopted by various manufacturers. Manufacturers ensure that compliant devices are compatible with computing systems implementing the bus protocol, and vice versa. PCI describes a family of related, standardized bus protocols. PCI includes the original PCI standard, PCI-eXtended (PCI-X), Accelerated Graphics Port (AGP), and PCI Express (PCIe, also referred to as PCI-XP). The term "PCI" or "PCI-based" may be used herein to describe any protocol in the PCI family of bus protocols. The peripheral devices illustrated in FIG. 1 can also include peripheral devices that implement bus protocols that are based on a PCI bus protocol, such as Non-Volatile Memory Express (NVMe), a bus protocol used for high-speed storage disks and that operates on top of a PCIe bus.

In the example shown in FIG. 1, PCI is provided as an example of a bus protocol that can be implemented by a computing system to connect to peripheral devices. A computing device can use other bus protocols, such as for example, Industry Standard Architecture (ISA), Extended ISA (EISA), Video Electronics Standards Association (VESA), Micro Channel, and any of the Advanced Technology Attachment (ATA) family of protocols, among others. The illustrated example can also be implemented with a combination of standard bus protocols, a combination of proprietary bus protocols, and/or a combination of standard and proprietary bus protocols.

The example computing system 100 may include one or more processors 102, a root complex 104, a memory subsystem 106, a switch 108, a bridge 114, and a number of peripheral devices. In this example, the peripheral devices include PCIe endpoints 110a-c and legacy endpoints 112a-c. The processors 102 may be general purpose computing devices such as are manufactured by Intel®, AMD®, ARM®, Qualcomm®, an others. The processors 102 are generally capable of executing software code. A processor may include multiple processing cores.

The root complex 104 may be a hardware device or a hardware and software device that connects the processors 102 and the memory subsystem 106 to the peripheral devices. The peripheral devices may be connected directly to the root complex 104. For example, the PCIe endpoint 110c is connected directly to the root complex 104. Alternatively or additionally, the peripheral devices may be connected to the root complex 104 through a switch 108. A bridge 114 may also be connected to the root complex 104. The root complex 104 may forward transactions to the processors 102 and direct responses from the processors 102 back to the peripheral devices. The root complex 104 may further generate transactions on behalf of the processors 102, and forward responses to those transactions back to the processors 102. In some cases, the root complex 104 may also route transactions from one peripheral device to another, and/or between peripheral devices, switches, and bridges. The root complex 104 may provide services for the computer system 100, such as a hot plug controller, a power management controller, an interrupt controller, and/or error detection and reporting. In some implementations, the root complex 104 may be implemented as part of a host system that includes one or more integrated processors and memory.

The memory subsystem 106 may provide temporary or long-term storage for data that may be used by the computing system 100. The memory subsystem 106 may include Dynamic Random Access Memory (DRAM), Synchronous DRAM (SDRAM), and/or Double Data Rate (DDR), among others. In some cases, the memory subsystem 106 may also include Read-Only Memory (ROM), such as Programmable Read-Only Memory (PROM), Erasable Programmable Read-Only Memory (EPROM), Electrically Erasable Programmable Read-Only Memory (EEPROM), and/or Flash EEPROM, among others. In some implementations, the root complex 104 may include a memory controller to manage transactions to and from the memory subsystem 106. In other implementations, the processors 102 may include a memory controller. Alternatively or additionally, the computing system 100 may include an external memory controller in communication with either the processors 102, the root complex 104, or both the processors 102 and the root complex 104, and the memory subsystem 106.

Peripheral devices are devices that can generate and/or respond to data transactions. For example, peripheral devices may be "requesters" (transaction generators) and/or "completers" (transaction responders). In PCI implementations, peripheral devices may include PCIe endpoints, where "endpoint" describes a peripheral device that is configured to communicate using a PCI protocol. Other peripheral devices may be legacy endpoints, that is, peripheral devices that are configured to communicate using a PCI protocol other than PCIe, such as the original PCI standard or PCI-X. Though not illustrated here, the computing system 100 may further include peripheral devices that implement another bus standard, such as for example Small Computer System Interface (SCSI), Serial ATA (SATA), or Parallel ATA (PATA), among others.

The switch 108 functions as a multi-port connector between various devices, including the root complex 104, peripheral devices, and possibly other switches and bridges. The switch 108 may route transactions between any of the devices connected to it. For example, the switch 108 may route transactions between the PCIe endpoints 110a-b and the legacy endpoint 112a, and between the various endpoints 110a-b, 112a and the root complex 104. The switch 108 may also provide arbitration to prioritize incoming and outgoing transactions. Devices connected to the switch 108 may treat the switch 108 as another requester and/or completer. Though not illustrated here, switches can also be connected to other switches to further expand the number of peripheral devices that can be connected to the computing system 100.

The bridge 114 may provide connectivity to other busses or switching fabrics. The other busses or switching fabrics may implement a PCI variant or another protocol. For example, in the example of FIG. 1, the bridge 114 provides connectivity to a bus implementing the original PCI standard. The bridge 114 may include mechanisms to translate from one bus protocol, such as the original PCI standard, to another protocol, such as PCIe.

Components in the computing system 100 may be connected through a shared bus. For example, in the illustrated example, the legacy endpoints 112b-c are connected to a shared PCI bus 116g. Alternatively or additionally, peripheral devices may be connected to the computing system 100 in a switching fabric topology. The interconnected devices illustrated in FIG. 1, including the root complex 104, the switch 108, the bridge 114, and the PCIe endpoints 110-c, form an example of a switching fabric. A switching fabric topology includes point-to-point connections between the devices connected to the fabric, and may include a routing system for passing messages between the devices. In a switching fabric, transactions may be spread across multiple physical links. In the example of FIG. 1, the switch 108 is connected to the root complex 104 with Bus 1 116a and the PCIe endpoint 110c is connected to the root complex with Bus 6 116e. Similarly, the bridge 114 is connected to the root complex with Bus 7 116f. Each of the PCIe endpoints 110a-b and the legacy endpoint 112a are also connected to the switch 108 with individual busses 116b-d. The connections between each of the root complex 104, the switch 108, the bridge 114, the PCIe endpoints 110a-c and the legacy endpoint 112a are point-to-point because each of the busses 116a-g are not shared with another device. Furthermore, a packet directed from one device to another (for example, from the root complex 104 to the PCIe endpoint 110a) is routed directly to its destination.

In some implementations, the connections between the devices in the computing system 100 may be numbered. For example, in the illustrated example, the connection between the switch 108 and the root complex 104 is labeled Bus 1 116a (Bus 0 may be internal to the root complex 104). Similarly, each of the busses connecting the PCIe endpoints 110a-b and the legacy endpoint 112a to the switch 108 are labeled Bus 3 116b, Bus 4 116c, and Bus 5 116d, respectively (Bus 2 may be internal to the switch 108). Furthermore, the connection between the root complex 104 and the PCIe endpoint 110c may be labeled Bus 6 116e, while the connection between the root complex and the bridge 114 may be labeled Bus 7 116f. Finally, the shared bus downstream from the bridge 114 may be labeled Bus 8 116g. In most cases the numbering of the busses is arbitrary, though bus numbers are generally assigned in a logical fashion. For example, Bus 0 may be located within the root complex 104, and the bus label may increment as the distance between the bus and the root complex 104 increases.

As noted above, peripheral devices may add to and/or modify the functionality of the computing system 100. For example, one PCIe endpoint 110a may implement a Wi-Fi adapter 120. Using the Wi-Fi adapter 120, the computing system 100 may be able to communicate wirelessly with a wireless access point 122, and thereby access a network. As another example, another PCIe endpoint 110b may implement a video card. A video card may include a port to connect a monitor 124 or other display device. As a further example, the computing system 100 may include a legacy endpoint 112a that implements a sound card. A sound card may include a port or jack that accepts a plug for a speaker 126 or other audio output device.

In some cases, a PCIe endpoint may be a multi-function device, that is, a device that provides the services of multiple devices. For example, the PCIe endpoint 110c may include an Ethernet adapter, and provide a connection to a gateway device 128, such as a DSL or cable modem. The PCIe endpoint 110c may also include a storage adapter, and provide a connection to a storage device 132. The one PCIe endpoint 110c thus may provide access to a network 130, as well as access to a storage device 132. The hardware and/or software components in the peripheral device that provide the services of, for example, a network interface or a storage controller may be called a "function." In the context of PCI devices, the terms "function" and "service" may be synonymous, though in other contexts this is not necessarily the case. Types of functions that may be provided by a peripheral device include, for example, mass storage controllers, network controllers, display controllers, multimedia devices, memory controllers, bridges, input devices docking stations, serial bus controllers, wireless controllers, satellite communications controllers, and encryption/decryption controllers, among others. In some implementations, functions can be added to a peripheral device, for example by connecting daughter cards or external devices to expansion slots or external ports on the peripheral device. In some implementations, a multi-function PCI device may provide up to eight separate functions. In many implementations, the functions provided by a peripheral device may be identified by a function number. For example, Function 0 of the PCIe endpoint 110c may be a mass storage controller, while Function 1 may be a network interface.

When a computing system such as computing system 100 illustrated in FIG. 1 initially powers up, the processors 102 may be unaware of any peripheral devices that are connected to the system. The processors 102 may be aware of the root complex 104, and possibly also that the root complex 104 is connected to one or more busses. To learn about the rest of the system, the processors 102 may execute a process to scan and configure the system. This process may be referred to as an enumeration process. The specific process of scanning for, locating, and identifying peripheral devices may be called discovery or discovering. During an enumeration process, software executing on the processors 102 may first scan each of the busses 116a, 116e, 116f connected to the root complex 104, and identify the switch 108, the PCIe endpoint 110c, and the bridge 114. Upon discovering the switch 108, the processors 102 may next scan the busses 116b-d connected to the switch 108. The processors 102 thereby discover the PCIe endpoints 110a-c and the legacy endpoint 112a. Upon discovering the bridge 114, the processors 102 may also scan Bus 8 116g; however, the bridge 114 may translate the scanning instructions to the protocol implemented by Bus 8 116g.

While scanning the busses, or possibly after, the processors 102 may also transmit configuration transactions to each of the devices it discovers. Configuration may include, for example, assigning one or more address spaces. For example, PCI devices typically include one or more of a memory address space and/or an Input/Output (I/O) address space. Each of these address spaces may be subdivided into multiple blocks. These address spaces and address space blocks may each be assigned a base address, where the base address establishes the region of memory that is assigned to the address space. In some implementations, these base addresses may be stored in configuration registers in a configuration space included in a device. Software executing on the processors 102 may be responsible for managing all available memory, and, for example, ensuring that no two devices are assigned overlapping memory regions. Alternatively or additionally, memory may be managed by a memory controller.

Configuration may further include programming information, such as a bus number and/or a device number, into configuration registers included in the peripheral devices. During configuration, the processors 102 may also read information from configuration registers. For example, the PCIe endpoint 110c may include a configuration register that indicates that it has two functions. The PCIe endpoint 110c may further include separate configuration registers for each function. Each function's configuration registers may further include information that indicates the capabilities of each function. For example, a configuration register may indicate that Function 0 is a mass storage controller, and another configuration register may indicate that Function 1 is a network interface. In most implementations, configuration registers are included in the hardware of a device.

In some implementations, the switch 108 and the bridge 114 also include a configuration space with configuration registers. In such implementations, the processors 102 may discover the switch and bridge functionality by reading configuration registers in the switch 108 and the bridge 114. The switch 108 and the bridge 114 may also be configured by the processors 102, for example with bus and device numbers.

Figure 2:
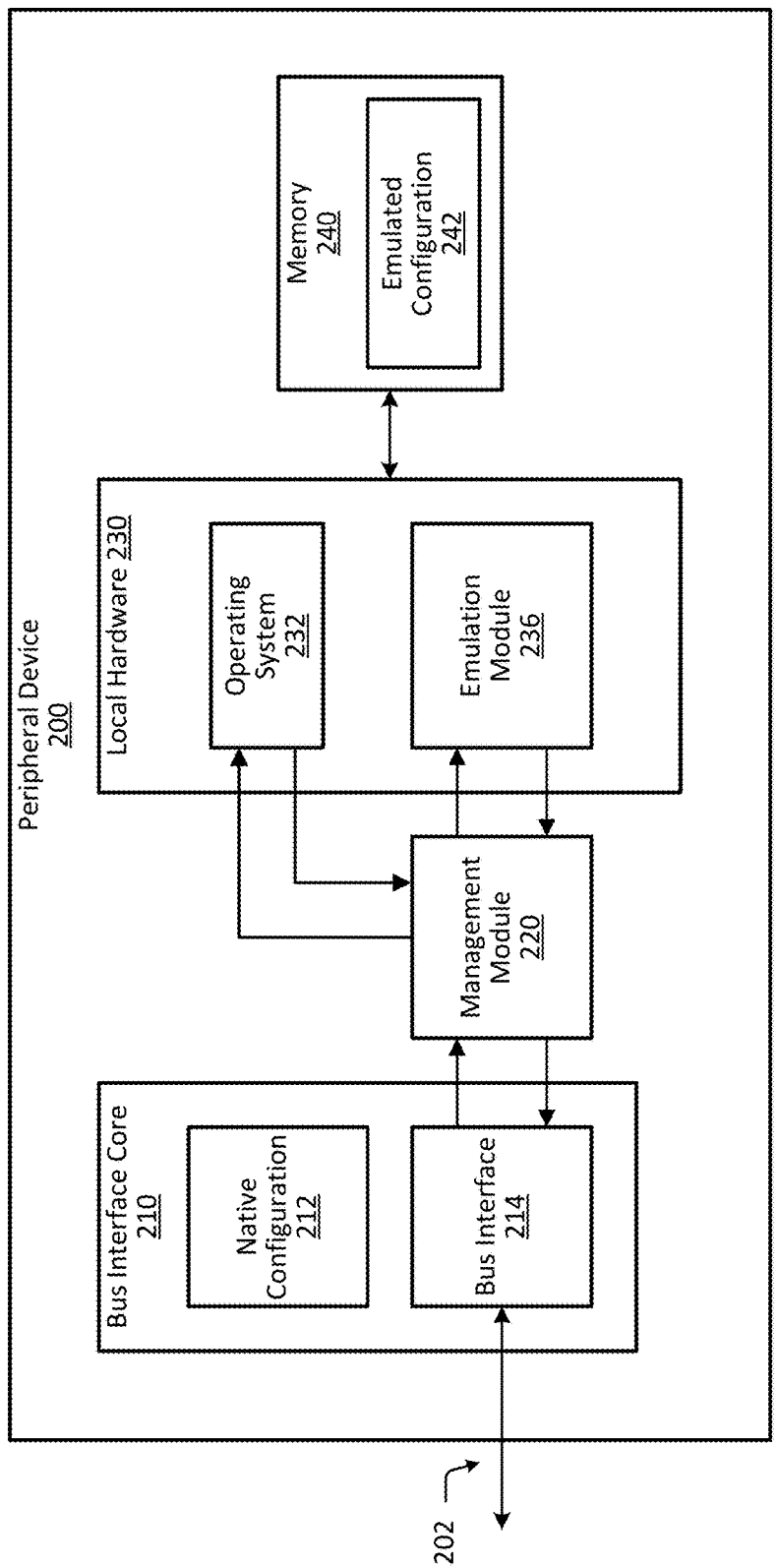
FIG. 2 illustrates an example of a peripheral device implementing an emulated configuration space.

FIG. 2 illustrates an example of a peripheral device 200 implementing an emulated configuration space. In various implementations, the peripheral device 200 can be used to replace one or more of the endpoints and/or root complexes illustrated in FIG. 1. Although the peripheral device 200 of FIG. 2 is shown as a standalone device, it should be noted that the components of the peripheral device 200 can be integrated with a host system (e.g. host processor) such that the peripheral device 200 and the host system can be implemented on the same silicon die or in the same package. For example, the peripheral device 200 can be an integrated graphics device implemented on the same chip as a host processor.

The illustrated example peripheral device 200 may implement any bus protocol, such as the PCI family of protocols, ISA, EISA, VESA, Multi-Channel, etc. A bus protocol may provide definitions for configuration registers, including their addresses, that a peripheral device is expected to include. The peripheral device 200 may emulate at least part of the configuration address space that is defined for the implemented bus protocol. In some cases, the peripheral device 200 may also include configuration registers that are not emulated, such as configuration registers for implementing the basic functionality of the peripheral device (e.g., for setting bus speed, etc.), and/or basic functionality common to all peripheral devices that implement a specific bus protocol. These non-emulated configuration registers may be referred to as "native" configuration space.

In some implementations, emulation refers to the ability of a program or device to imitate another program or device. For example, the peripheral device 200 may include an emulated configuration space to emulate the function or functions of different peripheral devices. For example, the peripheral device 200 may emulate a video card in one context, and a mass storage device in another context. As another example, the peripheral device 200, implementing one function and manufactured by one company, may be able to emulate a peripheral device manufactured by a different company and implementing the same function. In some implementations, the peripheral device 200 can be used to emulate more than one peripheral device. In some implementations, the peripheral device 200 can emulate an entire peripheral subsystem.

The peripheral device 200 may include a bus interface core 210, a management module 220, local hardware 230, and a memory 240. The peripheral device 200 may be in communication with a computing system over a bus 202. The bus 202 may implement a specific bus protocol.

The bus interface core 210 may include circuitry and logic required by the peripheral device 200 to communicate with the bus 202. For example, the bus interface core 210 may include a bus interface 214 for communicating with the bus 202. The bus interface 214 may include a physical connection to the bus 202, including circuitry to manage any electrical properties of the link to the bus 202. The bus interface 214 may further include logic for synchronizing to the bus 202, decoding incoming transactions and encoding outgoing transactions, and/or detecting and possibly managing errors in incoming or outgoing data, among other operations.

The bus interface core 210 may also include a native configuration space 212. In peripheral devices that do not include an emulated configuration space, typically the bus interface core 210 includes all the configuration registers of the peripheral device, for example, as defined by the bus protocol. Furthermore, in such implementations the bus interface core 210 typically services all read and write transactions to the configuration registers (which may also be referred to as configuration access requests or configuration accesses), and provides a response (if necessary) to the bus 202. In contrast, in the example peripheral device 200, the native configuration space 212 may include native configuration registers that are a subset of the configuration registers of the peripheral device 200. For example, the native configuration registers may be associated with basic functionalities that may be common to all peripheral devices for a given bus protocol (e.g., for setting bus speed, etc.), and/or may otherwise be configuration registers that are unnecessary or inconvenient to emulate. In some implementations, the native configuration space 212 can also be emulated.

In some implementations, the bus interface core 210 may detect read and write transactions addressed to the native configuration space 212. In such implementations, the bus interface core 210 may service configuration transactions directed to the native configuration registers 212. In these implementations, configuration transactions that are addressed to configuration space that is not within the native configuration space 212 may be directed to the management module 220. In some implementations, the bus interface core 210 directs all configuration read and write transactions, regardless of where they are addressed to, to the management module 220, and the management module 220 may determine whether a transaction is for the native configuration space 212 or not.

The management module 220 may provide management of read and write transactions directed to the peripheral device 200. Read and write transaction directed to the peripheral device 200 can include, for example, transactions to configuration registers, transactions directed to memory on board the peripheral device 200 or accessible through the peripheral device 200, transactions directed to I/O device(s) accessible through the peripheral device 200, and messaging transactions, by which a host can send messages to the peripheral device 200, among other types of transactions. In various implementations, the management module 220 can be implemented as a circuit on an Application Specific Integrated Circuit (ASIC) or a Field Programmable Gate Array (FPGA). Alternatively or additionally, in some implementations, the management module 220 can be implemented as a circuit on a System-on-a-Chip (SoC). In some implementations, the management module 220 can be a circuit on a SoC that also includes the local processor(s). In some implementations, the management module 220 can be implemented using firmware, where the firmware runs on ASIC and/or FPGA on the peripheral device 200.

In some implementations, the management module 220 may provide transaction logging. Transaction logging may be implemented by hardware and/or software that logs or tracks incoming transactions. Logging in this context means that the management module 220 adds the transaction to a buffer; that is, the transaction and any information related to the transaction (e.g., destination address(es), data, byte enables, etc.) are temporarily stored, and are later sent to the local hardware 230 for executing. In some implementations, the transaction may be stored in a memory and a reference or pointer to the transaction, possibly including the transaction's destination address, are stored in a buffer. Generally, transactions are stored in the order that they are received, though in some cases transactions may be stored in another order. For example, transactions that include priority information or some other ordering information may be stored according to that information. As another example, transactions may be grouped by their destination address, so that a group of transactions that are within the same address range can be executed together or in sequence.

Upon receiving a transaction, the bus interface core 210 may log the transaction with the management module 220. The bus interface core 210 may continue with other operations, without needing to wait for the logged transaction to complete. Transactions can be read from the transaction log and be serviced by the local hardware 230, for example, whenever the local hardware 230 is free to do so. The local hardware 230 may remove a transaction from the log when the transaction is read, which may indicate that the transaction has been completed. Alternatively or additionally, the local hardware 230 may remove the transaction after the transaction has been executed and/or responded to, also signaling completion of the transaction. Alternatively or additionally, the local hardware 230 may have some other mechanism (e.g. a register or a flag) that indicates to the logging mechanism that a transaction has been serviced or is in the process of being serviced.

The local hardware 230 can include one or more local processors, one or more local processor cores, a local processor cluster, programmable gate arrays, or control logic circuitry adapted to process transactions. In implementations that include multiple processors or processor cores, each processor or processor core may independently or cooperatively execute software code. In such implementations, each processor or processor core may service multiple transactions from the management module 210 in parallel. In implementations that include one processor, the processor may be multi-threaded, and also be able to service multiple transactions in parallel. The local hardware 230 may further run an operating system 232. The operating system 232 may be a commercial operating system, such as Linux, Windows®, iOS®, etc., or may be a proprietary operating system.

In various implementations, the local hardware 230, using one or more local processors, may process transactions logged by the management module 220. For example, the local processor(s) may execute a memory or I/O write, including locating the appropriate address space, reading a value from the appropriate address, and returning the value in a response transaction. For example, when the peripheral device is a network interface card, the local processor(s) may manage the transmission and receipt of packets. As another example, when the peripheral device is a hard drive, the processor(s) may manage the reading and writing of blocks of data to and from the disks. The local hardware 230 can also include other hardware for executing transactions. For example, the local hardware 230 may include hardware for routing packets and/or transferring data to and from hard disks. In some implementations, the processor(s) may execute specialized software for executing some types of transactions, such as configuration transactions.

In some implementations, one or more of the local processors may have a low-power or standby mode. In a low-power or standby mode, a processor powers down, not necessarily shutting down completely, in order to reduce the processor's power consumption. For example, the processor may disable some of its modules and/or disable some clocks. A processor may enter a low-power mode, rather than shutting down completely, so that the processor can restart operations relatively quickly. In various implementations, a processor can be woken from low-power mode by, for example, an interrupt or an event.

In some cases, instructions executing on a processor can include instructions that cause the processor to enter low-power mode. For example, when the processor's code may include a set of instructions that check how much time has passed since the processor had work to do, where "work" includes processing transactions from the management module 220 and/or executing processes on behalf of another processor. When the processor determines that it has done no work for a pre-determined, configurable amount of time, and/or that no new transactions have been logged with the management module 220 for a pre-determined amount of time the processor may determine that it should call a wait-for-event instruction, and go into low-power mode. In various implementations, a processor may also execute a wait-for-event instructions and go into low-power mode when the processor suffers an unrecoverable failure, such as a core dump, an error or failure assertion, an abort, etc. In these implementations, an event can wake the processor, which may then execute recovery instructions.

In various implementations, the management module 220 can also instruct a processor to enter low-power mode. The management module 220 may be configured to monitor the processor(s) in the local hardware 230, and determine whether a processor has become idle. A processor may be idle when the processor is not currently executing a transaction. Generally, the management module 220 can track whether a processor is executing a transaction through the management module's 220 transaction logging mechanism. For example, if the processor has fetched a transaction from the logging mechanism and has not yet informed the logging mechanism that the transaction has completed, the management module 220 can assume that the processor is still busy executing the transaction. Once the processor reports that it has completed the transaction, the management module 220 can assume that the processor is no longer executing the transaction. In various implementations, the management module 220 may alternatively or additionally use other mechanisms to determine whether a processor is currently executing transactions. For example, the management module 220 may periodically send a polling instruction to the processor, to ask the processor if it is idle.

In various implementations, the management module 220 can also prevent a processor from entering low-power mode. For example, upon receiving a transaction that is to be executed by a specific processor, the management module 220 can signal an event to that processor, which would prevent the processor from entering low-power mode. For example, the processor may be using a timer to determine whether the processor has been idle for a certain amount of time. The event from the management module 220 may disable or reset the timer, causing the processor to remain awake and able to receive transactions from the management module 220.

The management module 220 can further determine whether a processor is idle by examining transactions currently pending in the transaction log. When no new transactions for a particular processor have been added to the log for a pre-determined amount of time (e.g., 100 milliseconds or some configurable time period), the management module 220 can conclude that the particular processor will be idle for a while. Other transactions may be added to the logging mechanisms that will be executed by other processors, and the management module 220 will conclude that those other processors are not idle. But should no transactions be logged for the particular processor for a certain amount of time, the management module 220 will determine that the processor can be put into low-power mode. Generally, the period of time can be configured and/or has a default value.

Generally, the management module 220 may initiate low-power mode for a processor by instructing the processor to wait for an event. For example, the management module 220 may insert a wait-for-event instruction into an instruction queue for the processor. Alternatively or additionally, the management module 220 may send an in-band or out-of-band message to the processor, which causes the processor to execute a wait-for-event instruction. The wait-for-event instruction, when executed by the processor, may cause the processor to suspend executing instructions at a point in its instructions at which it encounters the wait-for-event instruction. That is, the processor may have in its queue the instructions A, B, C, and D, and if C is the wait-for-event instruction, the processor will suspend executing instructions upon executing C. The processor may then enter a low-power mode.

In various implementations, the management module 220 can also wake a processor that is in low-power mode. For example, the management module's 220 logging mechanism may receive a transaction that is to be executed by the processor that is in low-power mode. Because this processor is now needed, the management module 220 may signal an event to the processor. For example, the management module 220 can toggle a wire or input the processor that is dedicated to receiving event signals. Upon receiving the event, the processor may resume executing instructions at the point at which it suspended executing instructions. For example, to continue the example above, having executed instructions A, B, and C (with C being the wait-for-event instruction), the processor will resume at instruction D. In some implementations, the management module 220 may be configured to periodically wake a processor that is in low-power mode. For example, the management module 220 may have a timer, and when the timer runs out, the management module 220 may send an event or an interrupt to the processor that is in low-power mode. The processor can then be woken to execute routine tasks, such as garbage collection, collecting metrics, etc.

In various implementations, other events can also cause a processor that is in low-power mode to wake and resume operations. For example, another processor may signal an event, for example using a set event instruction. The other processor may require the processor that is in low-power mode to execute some operations. As another example, an interrupt signal can also wake a processor that is in low-power mode. In this example, once the processor wakes, it may resume executing instructions at the point at which it suspended operations, and then switch to interrupt handler code. In various implementations, the processor may also be able to wake itself. For example, the processor may be configured to periodically issue an event or an interrupt when it is in low-power mode. The processor may then wake from low-power mode to execute routine tasks.

In various implementations, a processor can also prevent another processor from entering low-power mode. For example, one processor may provide services for second processor. The second processor may signal an event to the first processor to indicate to the first processor that the first processor has work to do for the second processor. The first processor may have been idle for some time, but the event may reset or disable a timer that the first processor is using to determine whether it should enter low-power mode.

In some implementations, the local hardware 230 may implement or execute an emulation module 236. In some implementations, because incoming transactions may require fast response times, the emulation module can be executed in a secure environment or be executed with sufficient privileges such that processing of the transactions are not interrupted. The emulation module 236 may receive transactions from the management module 220, and may service those transactions. Servicing a transaction may include identifying the transaction's type (e.g., read and/or write), identifying the source of the transaction, identifying the destination that the transaction is directed to, executing the transaction, and/or generating a response to the transaction, if necessary. For example, a configuration read transaction may include reading a configuration register and responding with the information read from the register. As another example, a configuration write register may include updating the contents of the configuration register. In some cases, a configuration write may be responded to with an acknowledgment that the write transaction has completed.

In some implementations, the emulation module 236 may determine whether a configuration transaction is directed to the native configuration space 212 or emulated configuration space 242. When a configuration transaction is directed to the native configuration space 212, the emulation module 236 may communicate with the bus interface core 210 to read or write the native configuration register. When a configuration read is directed to emulated configuration space 242, the emulation module 236 may read a value representing the contents of the configuration register from the emulated configuration space 242. When a configuration write is directed to the emulated configuration space 242, the emulation module 236 may write or update data in the emulated configuration space 242 that represents the contents of the configuration register. In some implementations, a configuration transaction may be directed to configuration registers associated with one or more functions, in which case the emulation module 236 may identify the function and access a emulated configuration register that is specific to that function. In other implementations, a configuration transaction may have come from one of multiple sources, such as one of several virtual machines that may be running different operating systems. In such implementations, the emulation module 236 may identify the source, and access the emulated configuration register that may be designated or suitable for that source.

The memory 240 provides storage for data that may be operated on by the local hardware 230. The memory module 240 may include DRAM, (e.g., SDRAM, DDR-SDRAM), SRAM, flash, or some other memory type, or any combination thereof. In some implementations, the memory 240 can be implemented as an external memory module, or as an internal memory of the peripheral device 200, or a combination thereof. The memory module 240 may store an emulated configuration space 242. The emulated configuration space 242 may include representations for all or some of the configuration register address space defined for any number of peripheral devices. In some implementations, the emulated configuration space 242 includes configuration space that may affect the operation of a function of the peripheral device. In some implementations, the emulated configuration space 242 excludes native configuration space that may be basic and/or common to all peripheral devices implementing the bus protocol, or that may be unnecessary or inconvenient to emulate. The emulated configuration registers may include fields that are read only, clear-on-read (or have clear-on-read bits), may be both readable and writeable, may be write-zero-to-clear (or have write-zero-to-clear bits), and/or be write-one-to-set (or have write-on-to-set bits).

The emulated configuration space 242 may be stored in memory 240 as a text file, source code, object code, as a script, and/or in some other format that is readable by the emulation module 236. In some implementations, the emulated configuration 242 may be encrypted. In some implementations, the emulated configuration 242 can be modified or replaced. For example, additional emulated configuration registers, or updated versions of the emulated configuration registers, may be provided through a website on the Internet. In these implementations, the additional or updated emulated configuration registers can be downloaded from the Internet and uploaded to the memory 240. In some implementations, the memory 240 may store multiple emulated configuration spaces 242, or multiple versions of the same emulated configuration space 242.

Figure 3:
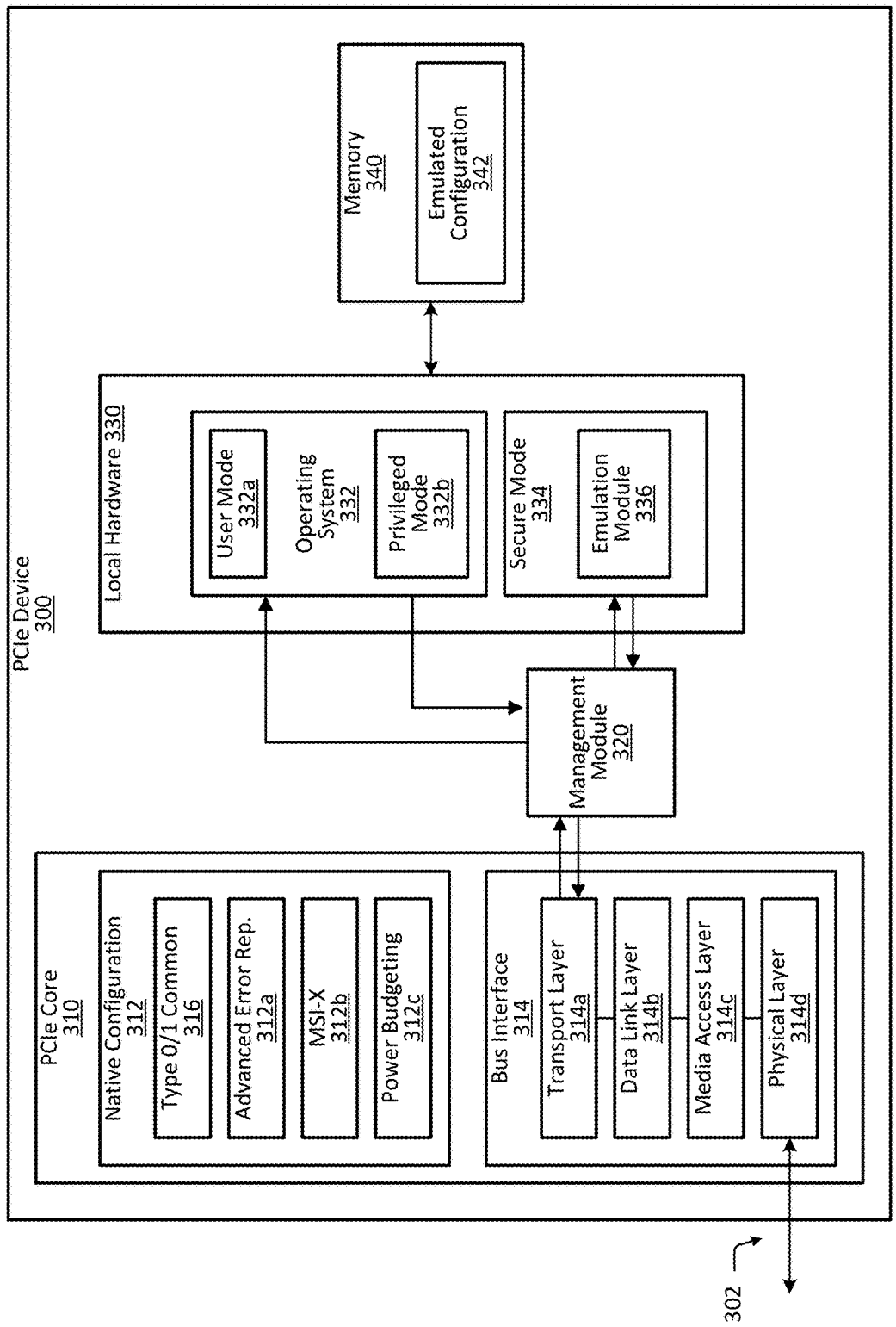
FIG. 3 illustrates an example of a PCIe implementation of a peripheral device.

FIG. 3 illustrates an example of a PCIe implementation of a peripheral device 300. The PCIe device 300 of FIG. 3 may include a PCIe core 310, a management module 320, local hardware 330, and a memory 340. The PCIe device 300 may communicate with a computing system through a bus 302. The bus 302 may implement the PCIe protocol.

The PCIe core 310 may include at least some of the functionality required to support communication on a bus using PCIe. The PCIe core 310 may include a bus interface 314. The bus interface 314 may implement network protocol layers 314*a-d* that manage incoming and outgoing transactions. For outbound transactions, the transaction layer 314*a* may form a packet with information provided by a transaction initiator, which may be for example the PCIe core 310 itself, the management module 320, or the local hardware 330. The data link layer 314*b* may add additional information to the packet, such as for example packet header information and/or error checking information that can be used by the recipient of the transaction to validate the integrity of the information. The media access layer 314*c* may provide addressing information such as physical address of the source and destination of the transaction. The physical layer 314*d* may encode the packet into electrical signals and transmit the packet onto the bus 302. For incoming transactions, the physical layer 314*d* can accept a packet from the bus 302 and decode the packet. The media access layer 314*c* may process the source and destination address of the transaction. The data link layer 314*b* may parse the packet header information and check for errors. The transaction layer 314*a* may convert the information contained in the packet into a format that can be processed by the PCIe core 310 and/or the local hardware 330.

The PCIe core 310 may also include native configuration space 312. The native configuration space 312 may include configuration registers that are associated with basic functionality, and/or that may be common to all PCIe-based peripheral devices, and/or that may be unnecessary or inconvenient to emulate. Examples of such registers include a Type 0/1 common register header 316, Advanced Error Reporting capability registers 312*a*, Message Signaled Interrupts extended (MSI-X) capability registers 312*b*, and power budgeting capability registers 312*c*. Any other configuration register space may be found, for example, in the emulated configuration space 342. In some implementations, native configuration space 312 may also be emulated. In some implementations, all PCI configuration registers for a PCIe-based peripheral device may be emulated.

In some implementations, the PCIe core 310 may detect read and write transactions addressed to the native configuration space 312. In such implementations, the PCIe core 310 may service configuration transactions directed to the native configuration space 312. Furthermore, in these implementations, configuration transactions that are addressed to a configuration space that is not within the native configuration space 312 may be directed to the management module 320. In other implementations, the PCIe core 310 directs all configuration read and write transactions to the management module 320, regardless of whether they are addressed to the native configuration space 312 or not.

The management module 320 may provide management of read and write transactions directed to the PCIe device 300, including memory, I/O, configuration, and messaging transactions, among others. In various implementations, the management module 320 can be implemented as a circuit on an ASIC or an FPGA. Alternatively or additionally, in some implementations, the management module 320 can be implemented as a circuit on an SoC. In some implementations, the management module 320 can be implemented using firmware, where the firmware runs on ASIC and/or FPGA on the PCIe device 300.

In some implementations, the management module 310 may provide transaction logging. Logged transactions are temporarily stored for later executing by the local hardware 330. Upon receiving a transaction, the PCIe core 310 may log the transaction with the management module 320. The PCIe core 310 may then continue with other operations. Transactions may be read from the log and be serviced by the local hardware 330. The local hardware 330 may remove a transaction from the log when the transaction is read, or may remove the transaction after the transaction has been executed and responded to, or otherwise indicate in the log that the transaction has been serviced or is in the process of being serviced.

The local hardware 330 may include one or more processors, one or more processor cores, a processor cluster, programmable gate arrays, or control logic circuitry adapted to process configuration transactions. The local hardware 330 may run an operating system 332. The operating system 332 may provide a user mode 332*a* and a privileged mode 332*b*. The user mode 332*a* may execute, for example, user applications that have been loaded into the PCIe device 300. The privileged mode 332*b* may execute system functions.

In various implementations, the local hardware 330, using one or more local processors, may process transactions logged by the management module 320. For example, the local processor(s) may execute a memory or I/O write, including locating the appropriate address space, reading a value from the appropriate address, and returning the value in a response transaction. The local hardware 330 may also include other hardware for executing transactions. In some implementations, the processor(s) may execute specialized software for executing some types of transactions, such as configuration transactions.

In various implementations, one or more of the local processor may have a low-power or standby mode. In some implementations, code executing on the local processors may include instructions that cause a processor to enter low-power mode. For example, the a processor's code may include instructions that check whether the processor has been idle for some time, and is likely to continue to be idle. The processor is idle when it is not currently executing a transaction, and no new transactions, targeting the processor, have been logged with the management module 320 for a pre-determined amount of time. When the processor has been idle for some time (where the amount of time can be configured), the processor may execute a wait-for-event instruction, and enter low-power mode.

In various implementations, the management module 320 can also determine whether a processor is idle and can be put into low-power mode. For example, the management module 320 can determine that a processor is not executing a transaction using the logging mechanism. When the logging mechanism shows that the processor is not currently executing a transaction (e.g., there is no outstanding, uncompleted transaction for the processor), the management module 320 can assume that the processor is not busy. Additionally, when no transactions, directed to the same processor, have been added to the logging mechanisms for a pre-determined amount of time (e.g. 100 ms, or some configurable time period), the management module 320 can assume that the processor will be idle for a little while. The management module 320 can then initiate low-power mode for the processor. For example, the management module 320 can cause the processor to execute a wait-for-event instruction. As another example, the management module can send a message or command to the processor, which would cause the processor to execute a wait-for event instruction.

In various implementations, the management module 320 can also wake a processor that is in low-power mode. For example, when a transaction is logged that is to be executed by a processor that is in low-power mode, the management module 320 can signal an event to the processor. The processor may have a signal or input dedicated to receiving event signals. Upon receiving the event signal, the processor may wake and resume executing instructions at the point at which it suspended executing instructions.

In various implementations, other events can also wake a processor that is in low-power mode. For example, an event signaled by another processor can also wake a processor that is in low-power mode. The other processor can, for example, send a set event instructions, trigger an event signal, and/or send an interrupt. Interrupts are another example of events that can wake a processor that is in low-power mode. Interrupts can originate from other hardware within the local hardware 330, from the management module 320, or from some other part of the PCIe device 300. In various implementations, the processor can also be woken periodically, so that the processor can conduct routine operations. The processor may be configured to wake itself (e.g., using an executing thread that periodically issues an interrupt or an event), or may be woken periodically by the management module 320.

In various implementations, a processor can also be prevented from entering low-power mode. For example, when a transaction is logged with the management module 320, the management module 320 may signal an event to the processor that is to execute the transaction. When that processor is active and not in low-power mode, the event signal may disable or reset a mechanism that would cause the processor to enter low-power mode. For example, the event signal may disable or reset a timer. As another example, another processor can prevent a processor from entering low-power mode. The other processor may require that a particular processor to do some work, and so may signal an event to the particular processor. The event signal may disable or reset a mechanism that would otherwise cause the processor to enter low-power mode.

The local hardware 330 may also include a secure mode 334 of operation (e.g., ARM secure mode, etc.). A program or software running in secure mode 334 may be isolated from other programs within the local hardware 330. For example, the operating system module 332 and/or applications running on top of the operating system module 332 may not be able to access modules running within the secure module 334. Conversely, in some implementations, programs running within the secure mode 334 may not be able to influence modules running outside of the secure module 334. Thus, the secure mode 334 may provide an environment in which a program can execute without intervention or interference from other programs that may be executing within the local hardware 330. Programs executing in the secure mode 334 may be highly optimized, and/or may have higher priority than other programs. In some implementations, the secure mode 334 may be implemented as a section of hardware and/or software that is logically and/or physically isolated within the local hardware 330.

In some implementations, an emulation module 336 can be implemented as emulation control logic circuitry in the local hardware 330, and/or as emulation software being executed in secure mode 334. The emulation software may be referred to as ConfigSpace Emulation Software (CSES). The emulation module 336 may receive transactions, including configuration transactions, from the management module 320, and may service those transactions. For example, servicing a configuration read transaction may include reading a configuration register from an emulated configuration space, and responding with the information read from the register. As another example, servicing a configuration write register may include updating the contents of the configuration register in the emulated configuration space. In some cases, a configuration write may be responded to with an acknowledgment that the write transaction completed.

In some implementations, the emulation module 336 may receive some or all configuration transactions directed to the peripheral device. In some implementations, the emulation module 336 may determine whether a configuration transaction is directed to the native configuration space 312 or the emulated configuration space 342. When a configuration transaction is directed to the native configuration space 312, the emulation module 336 may communicate with the PCIe core 310 to read or write the native configuration register. In some implementations, management module may handle native configuration register accesses without involving emulation module 336. When a configuration read is directed to emulation configuration 342, the emulation module 336 may read a value representing the contents of the configuration register from the emulated configuration space 342. When a configuration write is directed to emulated configuration space 342, the emulation module 336 may write or update data in the emulated configuration space 342 that represents the configuration register. In some implementations, the emulation module 336 may itself emulate one or more configuration registers internally. In such implementations, the emulation module 336 may read or write its internal representation of a configuration register, and may not need to access the emulated configuration space 342.

In some implementations, the emulation module 336 may make use of the PCI interrupt mechanism to process the emulated configuration register accesses. For example, the emulation module 336 may define the PCIe core 0 interrupt as a secure interrupt, and register a handler to this interrupt. An interrupt handler can be an independent software function that is triggered when an interrupt is received. When the PCIe core 0 interrupt is triggered, the emulation module 336 may be alerted and may begin servicing transactions from the management module 320. By defining the PCIe core 0 interrupt as secure, the interrupt may be hidden, or masked from non-secure modules, such as the operating system module 332. In some implementations, a secure interrupt may also interrupt a non-secure interrupt handler.

The memory 340 provides storage for data that may be operated on by the local hardware 330. The memory 340 may include DRAM, (e.g., SDRAM, DDR-SDRAM, etc.), SRAM, flash memory, or some other memory type or combinations thereof. In some implementations, the memory 340 can be implemented as an external memory module, or as an internal memory of the peripheral device 200, or a combination thereof. The memory 340 may store an emulated configuration space 342. The emulated configuration space 342 may include representations for all or some of the 4 KB PCIe configuration address space. In some implementations, the emulated configuration space 342 may include PCIe extended capability registers. For example, the emulated configuration space 342 may include Advanced Error Reporting capability registers, Virtual Channel capability registers, Device Serial Number registers, and/or Power Budgeting capability registers. Alternatively or additionally, the emulated configuration space 342 may include Single Root-I/O Virtualization (SR-IOV) extended capability registers. In such cases, the emulated configuration space 342 may include capability registers that allow SR-IOV physical and virtual functions to be controlled. SR-IOV is discussed in further detail below.

In some implementations, the emulated configuration space 342 may be dynamically replaced and/or modified. For example, PCIe extended capabilities may be added or removed in emulated configuration space 342. In other implementations, the PCIe device 300 may include multiple emulated configuration spaces suitable for different virtual machines, different operating systems, and/or different device types.

As mentioned above, transaction logging may be implemented to track incoming transactions. The transaction logging may maintain a log of some or all incoming read and write transactions. In some implementations, the transaction logging may use several registers to log a given transaction. These registers may include an address register, a data register, and a completion register.

The address register may be set when a read or write transaction is transmitted to the transaction logging. The address register may contain information necessary to identify the register that is the target of the inbound transactions. In some cases, the address register may be cleared when it is read by emulation module 336. As an example, the address register may include information such as a valid indicator indicating whether the address register is valid, a transaction type, a target register offset, read/write indicator indicating whether the transaction is a read access or a write access, a device function field indicating which physical or virtual function is the target of the access, and a target bus number. In some implementations, setting the valid indicator may trigger an interrupt or low-latency notification to an emulation module to request the emulation module to service the access request.

The data register may store data associated with the transaction. For write transactions, the data register may store the data to be written. For read transactions, the data register may store the data read from the target configuration register by emulation module 336.

The completion register can indicate the status of a read or write transaction. The completion register may be written to by the local hardware 330 when the local hardware 330 completes a transaction. The values written to the completion register can be used to format a completion response that is sent to the initiator of the transaction (e.g., a root complex). For example, the values in the completion register may be used to generate a completion indication. A completion indication may identify the bus number, device number, and/or function number of the peripheral device, and function that accepted and serviced the transaction. In some cases, when the local hardware 330 writes to the completion register, the pending configuration transaction is considered complete and may be released. In some cases, the completion register may be only written once for each inbound transaction.

As an example, the completion register may include information such as a completion status, a target bus number, a target device number, and a target function number. The completion status may indicate whether the transaction completed successfully, the transaction was invalid (e.g., the target function or target bus number may not exist), the transaction should be retried (e.g., the peripheral device could not accept the transaction, and the transaction should be transmitted again by transaction's initiator), or the transaction was aborted (e.g., the peripheral device accepted, but could not complete the transaction). The target bus number may indicate which bus number to use in the completion identifier (e.g., the target bus number provided in the address register is returned, or a bus number associated with target function is returned). For example, the peripheral device may reside on bus number 1. An inbound transaction may be Configuration Type 1 configuration transaction, and may be directed to bus number 2. In this case, the local hardware 330 may return either bus number 1 or 2. The target device number may indicate which target device number to use in the completion identifier (e.g., the target device number provided in the address register is returned, or a target device number associated with the target function is returned). The target function number may indicate which target function number to use in the completion identifier (e.g., the target function number provided in the address register is returned, or a port function number is returned).

In addition to flexibility and configurability, a peripheral device with emulated configuration techniques may also provide enhanced security, which may not be available to non-emulated peripheral devices.

For example, a peripheral device may be subject to a denial of service attack. In such an attack, a malicious virtual machine may flood the peripheral device with configuration transactions in an attempt to cause the device hardware and/or software to fail. However, a peripheral device with an emulation module may be able to track the rate of configuration accesses by the virtual machine (e.g., by monitoring the transaction log). The emulation module may thus detect an unusual increase in accesses by a virtual machine, and may deny any further accesses from that virtual machine.

As another example, a virtual machine may access an uninitialized or non-existent function. An ordinary peripheral device may hang in such cases. The emulation module, however, may capture such accesses, and respond appropriately by emulating configuration registers for the uninitialized or non-existent function, or recognizing that the access is to a non-existent function. The emulation module may thus prevent the peripheral device from hanging.

As yet another example, a virtual machine may initiate a reset of a function at an inappropriate time. The emulation module, however, may capture and log such software-based resets. The emulation module may subsequently process the reset at an appropriate time, for example, after allowing all pending transactions to complete. Alternatively, the emulation module may simply block the inappropriate reset.

As a last example, a virtual machine may attempt an invalid or untimely configuration change. For example, the virtual machine may attempt to change the speed or width of the bus link. The emulation module, however, may capture all configuration accesses, including these inappropriate configuration changes, and may reject these invalid or untimely configuration change accesses.

Figure 4:
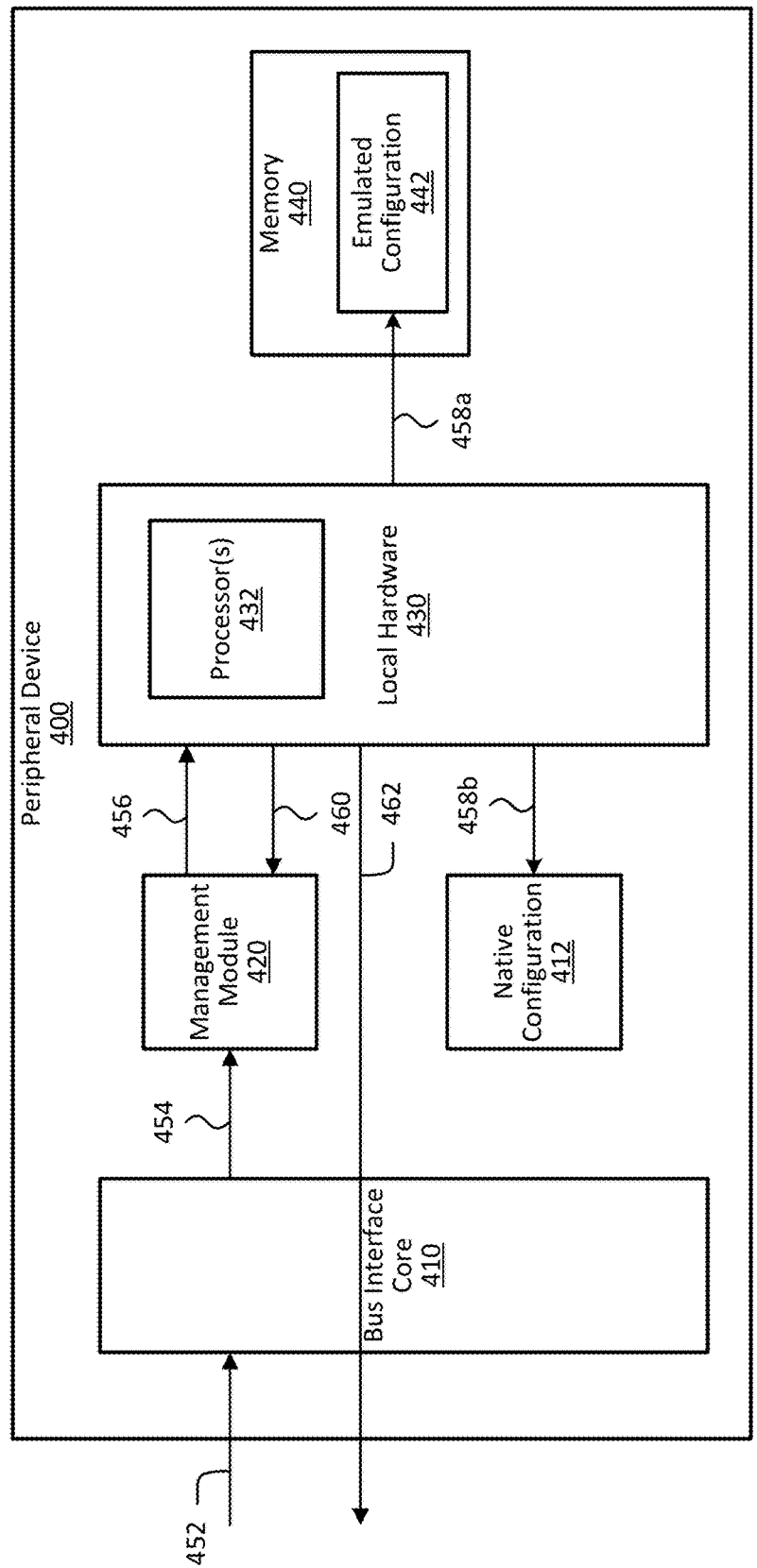
FIG. 4 illustrates an example of a peripheral device that includes one or more processors configured to enter a low-power mode while idle, and wait for an event.

FIG. 4 illustrates an example of a peripheral device 400 that includes, among local hardware 430, one or more processors 432 configured to enter a low-power mode while idle, and wait for an event. FIG. 4 further illustrates an example where the peripheral device 400 receives a read transaction. In some cases, the read transaction may be handled by the processor(s) 432. In other cases, the processor(s) 432 are not needed to handle the read transaction, and the read transaction can be handled by other local hardware 430. The peripheral device 400 may flexibly emulate other peripheral devices and/or multiple device functions. The peripheral device 400 may include a bus interface core 410, management module 420, native configuration space 412, an emulated configuration space 442, and a memory 440.

The bus interface core 410 may include functionality for communicating with a bus that connects peripheral device 400 to a computing system. The bus interface core 410 may include a physical connection to the bus, and may provide hardware and/or software to manage the electrical connection to the bus, to decode incoming transactions and encode outgoing transactions, and/or to manage errors in incoming and outgoing transactions.

The management module 420 may track incoming transactions, including read and write transactions and any variations of read and write transactions. The management module 420 may maintain a log of some or all incoming transactions. The log may take the form of a list or table, or a combination of lists and/or tables. In some implementations, the management module 420 may assign priorities to incoming transactions, so that some transactions may be serviced sooner than others. In such implementations, the management module 420 may also maintain coherency, that is, ensure that reads and writes happen in a proper order. For example, when a read transaction of a register is received after a write transaction for the same register, the write transaction must occur first. In other implementations, the management module 420 maintains incoming transactions in the order that they were received.

The native configuration space 412 may include native configuration registers that are not being emulated by the peripheral device 400. Native configuration registers generally have physical addresses, and thus may occupy one or more address spaces.

The local hardware 430 may include one or more processors 432, one or more processor cores, and/or a processor cluster. The local hardware 430 may also include integrated circuit devices, programmable gate arrays, and/or control logic circuitry adapted to process transactions. The processor(s) 430 may execute software code, such as an operating system and/or emulation software, as described above. In some implementations, the functionalities of the emulation software can be implemented in hardware (e.g., control logic circuitry). The local hardware 430 may service some or all incoming read and write transactions, including both transactions targeting native configuration space 412 and transactions targeting emulated configuration space 442. In some cases, a transaction is executed by the processor(s) 432. In other cases, a transaction is executed by the local hardware, and the processor(s) 432 are not needed.

The memory 440 provides storage for data that may be operated on by the peripheral device 400. The memory 440 may store an emulated configuration space 442. The emulated configuration space 442 may include representations for some or all of the configuration registers defined for one or more peripheral devices that are being emulated by peripheral device 400. In some implementations, emulated configuration space 442 may include primarily configuration registers that affect the operation of the peripheral device being emulated. The emulated configuration space 442 may be stored in the form of a text file, source code, object code, a script, or some other format. In some implementations, the emulated configuration space 442 may be encrypted. In some implementations, the memory 440 may include more than one emulated configuration space. For example, a peripheral device may be emulating multiple other peripheral devices and/or multiple functions. In such cases, the memory 440 may include an emulated configuration space for each peripheral device being emulated, and/or for each function being emulated.

In various implementations, the processor(s) 432 may be able to enter a low-power mode, in order to reduce their power consumption. Typically, a processor 432 is configured to execute a sequence of instructions. The sequence of instructions may include instructions that allow the processor 432 to determine that it has become idle. For example, the sequence of instructions may include instructions that check whether the processor 432 is currently processing a transaction. The sequence of instructions can further include instructions that determine whether any new transactions have been received that are to be executed by the processor within a pre-determined amount of time. In various implementations, the processor 432 may be notified, for example by the management module 420, when the peripheral device 400 receives a transaction that is to be executed by the processor 432. For example, when the management module 420 logs a new transaction for the processor 432, the management module 420 may send a signal or message (e.g., a doorbell signal) to the processor 432. When a pre-determined, configurable amount of time has passed since a new transaction for the processor 432 has been logged, and the processor 432 is not currently executing a transaction, the processor 432 can be considered idle.

The sequence of instructions being executed by the processor 432 can further include a wait-for-event instruction that is called when the processor determines that it is idle. In various implementations, the wait-for-event instruction, when called, may cause the processor 432 to initiate a low-power mode. In low-power mode, the processor 432 may disable or shut down some functions, so that the processor 432 consumes less power. Executing the wait-for-event instruction may also cause the processor 432 to suspend executing its sequence of instructions. The processor 432 will generally suspend executing instructions at the point in the sequence at which it executed the wait-for-event instruction. The processor 432 may then wait for an event, or some other activity, that will cause the processor 432 to exit low-power mode and resume operations.

In the example illustrated in FIG. 4, the peripheral device 400 receives 452 a read transaction from the bus. For example, the peripheral device may receive a read transaction from a root complex or a host. The bus interface core 410 may receive the read transaction, and determine that it should accept the transaction. The bus interface core 410 may examine, for example, a target bus identifier, device identifier, function identifier, and/or address in the transaction to make this determination. The peripheral device 400 may be emulating more than one peripheral device and/or more than one function. Hence, the bus interface core 410 may accept transactions for any number of peripheral devices that are being emulated.

Upon accepting the read transaction 452, the bus interface core 410 may transfer 454 the read transaction to the management module 420. The management module 420 may add the read transaction to its transaction log. In some implementations, once the read transaction has been logged, the bus interface core 410 may move on to other operations, and does not need to wait for the read transaction to be completed.

The management module 420 may next determine whether a processor 432 is needed to execute the transaction, or whether the transaction can be handled by some other local hardware 430. In some cases, some local hardware 430 can execute the read transaction, and a processor 432 is not needed. For example, a configuration read transaction can, in some implementations, be executed by emulation hardware. The emulation hardware can determine whether the configuration read transaction is directed to the emulated configuration space 442 or to the native configuration space 412. This determination may be based on the address of the configuration register to be read, which may fall within emulated configuration space or native configuration space. The emulation hardware may subsequently read 458*a* the value from an emulated configuration register from the emulated configuration space 442 or may read 458*b* the value from a configuration register in the native configuration space 412.

As another example, the local hardware 430 may include hardware for executing memory read transactions. For example, the local hardware 430 may include a Direct Memory Access (DMA) module, which may be configured to execute read transactions to read local memory 440 or some other memory that is accessible through the peripheral device 400. As another example, the local hardware 430 may include hardware for executing I/O read transactions. For example, the local hardware 430 may include logic for memory-mapped I/O transactions (MMIO). When the address space of a peripheral device is included in the system memory of a computing device, the address space and/or the peripheral device may be referred to as memory-mapped I/O, or MMIO. In this example, the local hardware 430 may include logic that translates an I/O read transaction address, as received 452, into an address that can be used in a read transaction for an I/O device that is accessible through the peripheral device 400.

In some cases, however, the management module 430 may determine that a read transaction needs to be executed by a processor 432. For example, the read transaction may be to a register in the processor 432, may be to a special address, may have an invalid address, or may otherwise be addressed, flagged, or constructed in such a way that the local hardware 430 is unable to execute the transaction. In these cases, when the management module 430 adds the read transaction to its transaction log, the management module 430 may also signal 456 an event to a processor 432 that is to execute the transaction. For example, in various implementations, the processor 432 may include one or more event inputs, which are designated for signaling events to the processor 432. An event input is distinct from an interrupt input, which is designated for signaling interrupts to the processor 432. Interrupts generally require that the processor 432 execute an interrupt service routine, while events do not require any similar such routine. Instead, upon waking with an event, the processor 432 can resume executing instructions right where it stopped when going into low-power mode. In these implementations, the management module 420 may use the event input to signal an event to the processor 432.

In various implementations, the event signal causes the processor 432 to exit low-power mode and to resume executing instructions. Generally, the processor 432 will resume executing its sequence of instructions from the point at which the processor suspended executing instructions when it executed the wait-for-event instruction. The wait-for-event instructions thus can be used to pause and quickly resume the operation of a processor. In contrast, an interrupt mechanism, such as a wait-for-interrupt instruction, requires that a processor first execute an interrupt service routine before the processor can resume executing instructions. A processor that is relying on an interrupt mechanism to be woken from a low-power mode thus may not be able to resume operations as quickly as a processor that is relying on an event mechanism. It should be noted that an interrupt can also wake a processor that is waiting on an event. When an interrupt wakes the processor 432, the processor 432 will execute an interrupt service routine prior to resuming normal operations, or may execute an interrupt service routine and return to low-power mode.

In some implementations, once the processor 432 has exited low-power mode and resumed executing transactions, the processor 432 may read an event register. The event register may provide information about the event that woke the processor 432 from low-power mode. For example, in the illustrated example, the event register may indicate that the event was a new read transaction that is read to be executed by the processor 432. In other examples, the event may indicate that another processor needs the processor 432 to do something.

In various implementations, once the processor 432 has resumed executing instructions, the processor 432 may fetch 460 the one or more transactions from the management module's 420 log. The processor 432 may then execute the read transaction, possibly including correcting errors in the transaction, performing an operation based on the read transaction, and/or reading a value.

Generally, whether a processor 432 or some other local hardware 430 executes the read transaction, in most cases the processor 432 or local hardware 430 will return 462 a response to the bus-interface 410, for returning to the read transaction's requestor. The response may include a value read, a success or failure indicator, and/or an error code.

The peripheral device 400 may be a peripheral device that implements a PCI-based protocol. When the peripheral device 400 is a PCI peripheral device, the read transaction example described above may be described as follows.

The bus interface core may receive 452 a read Transaction Layer Packet (TLP). The read TLP may be received from, for example, a root complex. The read TLP may be received on a PCIe bus, and may be received by a PCIe core. The PCIe core may unpack the TLP and reduce the read request to a format that is more easily processed.

PCIe core (e.g., the bus interface core 410) may transfer 454 the read request to the management module 420 for transaction logging. For example, the PCIe core may update an address register in the transaction logging with the read request information. The management module may add the read request to its log of pending transactions. After transferring 454 the read request to the configuration transaction logging, the PCIe core may be free to execute other operations.

The management module 420 may determine whether the read request can be handled by the local hardware 430 or whether a processor 432 needs to handle the read request. When a processor 432 needs to handle the read request, the management module 420 can signal 456 an event to a processor 432. The event signal may wake the processor 432 from a low-power mode. Once the processor 432 has resumed executing instructions, the processor 432 may retrieve 460 the read request from the transaction logging. Once the processor 432 has executed the read request, the processor may transfer 460 the value read to the PCIe device core, and the PCIe device core may subsequently package and transmits the read value to the root complex. For example, the PCIe device core may transmit a Completion TLP to the root complex. In some implementations, if the read request cannot be completed, the processor 432 update the completion status accordingly.

Figure 5:
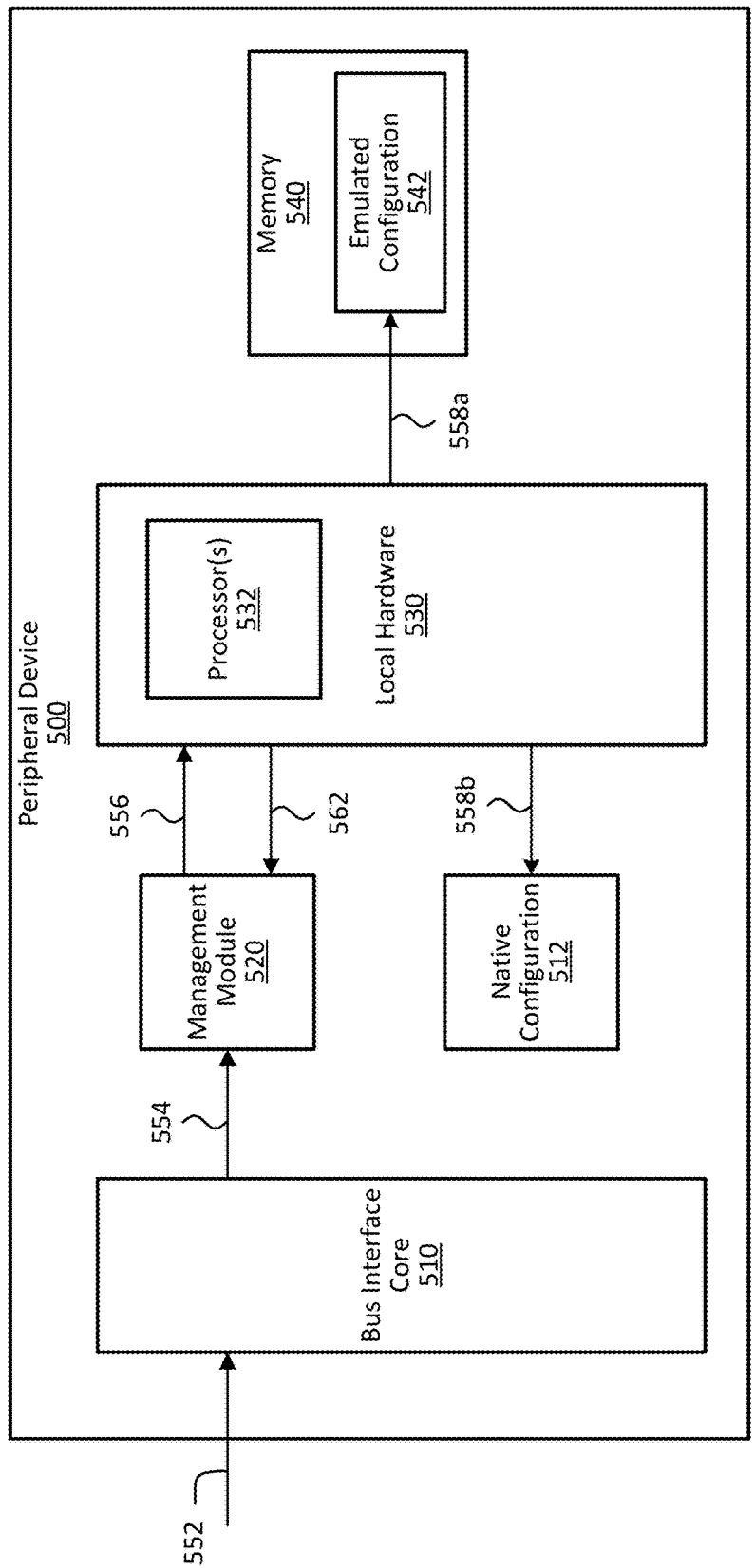
FIG. 5 illustrates an example of a peripheral device that includes one or more processors configured to enter a low-power mode while idle, and wait for an event.

FIG. 5 illustrates an example of a peripheral device 500 that includes, among local hardware 530, one or more processors 532 configured to enter a low-power mode while idle, and wait for an event. FIG. 5 further illustrates an example where the peripheral device 500 receives a write transaction. In some cases, the write transaction may be handled by the processor(s) 532. In other cases, the processor(s) 532 are not needed to handle the write transaction, and the write transaction can be handled by other local hardware 530. The peripheral device 500 may flexibly emulate different peripheral devices and/or multiple device functions. The peripheral device 500 may include a bus interface core 510, management module 520, native configuration space 512, an emulation module 530, and a memory 540.

The bus interface core 510 may include functionality for communicating with a bus that connects the peripheral device to a computing system. The management module 520 may track incoming transactions. The management module 520 may maintain a log of some or all incoming read and write transactions. The native configuration space 512 may include configuration registers that are not being emulated by peripheral device 500. The local hardware 530 can include one or more processors, one or more processor cores, and/or a processor cluster, as well as integrated circuits, programmable gate arrays, and/or control logic circuitry adapted to process transactions. The processor(s) 532 may execute software code, such as an operating system and/or an emulation module. In some implementations, the functionalities of the emulation software can be implemented in hardware (e.g., control logic circuitry). The memory 540 provides storage for data that may be operated on by the peripheral device 500. The memory 540 may include one or more emulated configuration spaces. An emulated configuration space 542 may include representations for some or all of the configuration registers defined for a peripheral device and/or function that is to be emulated. In some implementations, the memory 540 may include an emulated configuration space 542 for each peripheral device and/or function that is to be emulated.

In various implementations, the processor(s) 532 may be able to enter a low-power mode, in order to reduce their power consumption. For example, a processor 532 may be executing a sequence of instructions. The sequence of instructions may include instructions that allow the processor 532 to determine that the processor 532 is idle. The processor 532 may be idle when it is not currently executing a transaction, and the transaction log has not received a new transaction to be executed by the processor 532 for a pre-determined, configurable amount of time. The sequence of instructions may further include a wait-for-event instruction that can be executed when the processor 532 determines that it is idle. The wait-for-event instruction may cause the processor 532 to suspend executing the sequence of instructions. Generally, the processor 532 will suspend executing instructions at the point in the sequence where it executed the wait-for-event instruction.

In the example illustrated in FIG. 5, the peripheral device 500 receives 552 a write transaction from the bus. The write transaction may be received from, for example, a root complex or a host. The bus interface core 510 may receive the write transaction, and determine that it should accept the transaction. The peripheral device 500 may be emulating more than one peripheral device and/or function. Hence, the device core 510 may accept transactions for any number of peripheral devices that are being emulated.

The bus interface core 510 may transfer 554 the write transaction to the management module 520. The management module 520 may add the write transaction to its transaction log. Once the write transaction has been logged, the bus interface core 510 may move on to other operations, and need not wait for the write transaction to be completed.

The management module 520 may further determine whether the write transaction can be executed by the local hardware 530, or should be executed by a processor 532. In some cases, the write transaction can be executed by the local hardware 530 alone. For example, a configuration write transaction can, in some implementations, be executed by emulation hardware. The emulation hardware can determine whether the configuration write transaction is directed to the emulated configuration space 542 or to the native configuration space 512. This determination may be based on the address of the configuration register to be written, which may fall within emulated configuration space or native configuration space. The emulation hardware may subsequently write 558a a value to an emulated configuration register in the emulated configuration space 542 or may write 558b a value to a configuration register in the native configuration space 412. In various implementations, the local hardware 530 can also include hardware that can execute memory write transactions and I/O write transactions.

In some cases, however, the management module 530 may determine that a write transaction needs to be executed by a processor 532. For example, in some implementations, the peripheral device 500 may be configured to group memory-mapped I/O transactions that fall within the same address space block, so that write transactions within the address space block be written in one transaction or one burst. In these implementations, a processor 532 may assist in the grouping process. In these cases, when the management module 530 adds the write transaction to its transaction log, the management module 530 may also signal 556 an event to a processor 532 that is to execute the transaction. For example, in various implementations, the processor 532 may include one or more event inputs, which are designated for signaling events to the processor 532. An event input is distinct from an interrupt input, which is designated for signaling interrupts to the processor 532. Interrupts generally require that the processor 532 execute an interrupt service routine, while events do not require any similar such routine. Instead, upon waking with an event, the processor 532 can resume executing instructions right where it stopped when going into low-power mode. In these implementations, the management module 520 may use the event input to signal an event to the processor 532.

In various implementations, the event signal causes the processor 532 to exit low-power mode and to resume executing instructions. Once the processor 532 has resumed executing instructions, the processor 532 may fetch 562 the one or more transactions from the management module's 520 log, including the write transaction. The processor 532 may then execute the write transaction.

The peripheral device 500 may be a peripheral device that implements a PCI-based protocol. When the peripheral device 500 is a PCI peripheral device, the example write transaction described above may be described as follows.

The bus interface core may receive 552 a write TLP. The write TLP may be received from, for example, a root complex. The write TLP may be received on a PCIe bus, and may be received by a PCIe core. The PCIe core may unpack the TLP and reduce the request to a format that is more easily processed.

The PCIe core (e.g., the bus interface core 510) may transfer 554 the write request to the management module 520 for transaction logging. The management module 520 may add the write request to its log of pending transactions. After transferring 554 the write request to the management module 520, the PCIe core may be free to execute other operations.

The management module 520 may determine whether the write request can be handled by the local hardware 530, or whether a processor 532 needs to handle the write request. When a processor 532 needs to handle the write request, the management module 520 can signal 556 an event to the processor 532. The event signal may wake the processor 532 from a low-power mode. Once the processor 532 has resumed executing instructions the processor 532 may retrieve 562 the write request from the transaction logging.

In some cases, once the processor 532 has executed the write transaction, the processor 532 may send a response, indicating that the write request completed, and whether the request completed successfully. For example, the PCIe device core may transmit a Completion TLP to the root complex. In some implementations, if the read request cannot be completed, the processor 532 may update the completion status accordingly.

Figure 6:
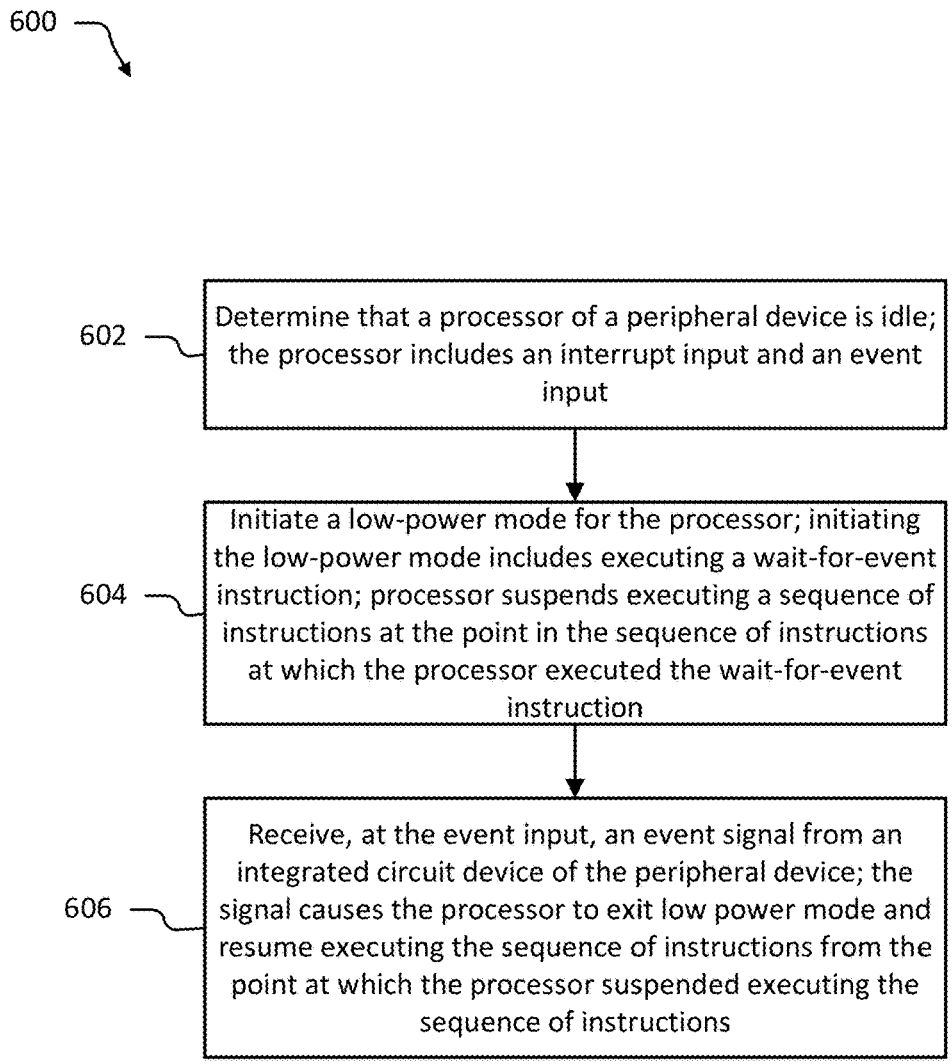
FIG. 6 illustrates an example of a process for placing a processor of a peripheral device into a low-power mode, and waking the processor using a hardware mechanism.

FIG. 6 illustrates an example of a process 600 for placing a processor of a peripheral device into a low-power mode, and waking the processor using a hardware mechanism. This process 600 may be implemented by the systems described above, such as for example, the systems describe with respect to FIGS. 2-5. For example, the process 600 may be implemented by peripheral device that includes one or more processors.

At step 602, a processor of the peripheral device may determine that the processor is idle. The processor may include an interrupt input and an event input. The processor may be idle when the processor is not executing a transaction, and no transactions to be executed by the processor have been received by the peripheral device for a pre-determined amount of time.

At step 604, the processor may initiate a low-power mode for itself. Initiating the low-power mode may include executing a wait-for-event instruction. Executing the wait-for-event instruction may cause the processor to suspend executing a sequence of instructions at the point in the sequence at which the processor executed the wait-for-event instruction.

At step 606, the processor may receive, at the event input, an event signal. The event signal may be received from an integrated circuit device of the peripheral device. The integrated circuit device may be configured to manage and log transactions received by the peripheral device. The event signal may cause the processor to exit low-power mode and resume executing the sequence of instructions from the point at which the processor suspended executing the sequence.

In some implementations, the event that trigger the event signal may indicate that a transaction that is to be executed by the processor has been received by the peripheral device. For example, the integrated circuit device may have received and logged a write transaction that needs to be executed by the processor.

In some cases, after resuming executing the sequence of instructions, the processor may once again determine that it is idle, and again execute a wait-for-event instructions to go into low-power mode. In some cases, while in low-power mode, the processor may receive a set-event instruction from another of the peripheral device's processors. The other processor may have issued the set-event instructions because it needs the processor to perform some operations. The set-event instruction may cause the processor to exit low-power mode and resume executing the sequence of instructions.

In some cases, when again in low-power mode, the processor may receive an interrupt signal at the interrupt input. The interrupt signal may cause the processor to exit low-power mode and execute instructions for an interrupt handling routine. The interrupt handler routine would be executed instead of the instructions that would otherwise follow the wait-for-event instruction that cause the processor to enter low-power mode. In some cases, the interrupt that caused the interrupt signal may require additional handling outside of the interrupt handler routine. In these cases, the interrupt handler routine may include a set-event instruction. When the processor executes the set event instruction, the processor may resume executing the sequence of instructions at the point at which the processor suspended executing the sequence to enter low-power mode.

In some cases, once the processor has resumed executing instructions, the processor may receive another event signal. The processor may subsequently determine that it is idle. The processor, however, may be prevented from executing a wait-for-event instructions and entering low-power mode by the event signal. For example, another processor may send a set-even instruction when the other processor requires the processor to not go into low-power mode. As another example, the integrated circuit device may have received a new transaction that is to be executed by the processor, and may signal an event to the processor to prevent the processor from entering low-power mode, so that the processor is available to execute the new transaction.

In some implementations, the processor may periodically generate a signal while it is in low-power mode, where the periodic signal causes the processor to exit low-power mode and resume executing instructions. For example, the processor may have a timer, and when the timer expires, the processor issues an interrupt, which causes the processor to wake from low-power mode. Periodically waking the processor may allow the processor to run routine background tasks, such as garbage collection or collection of statistics.

Figure 7:
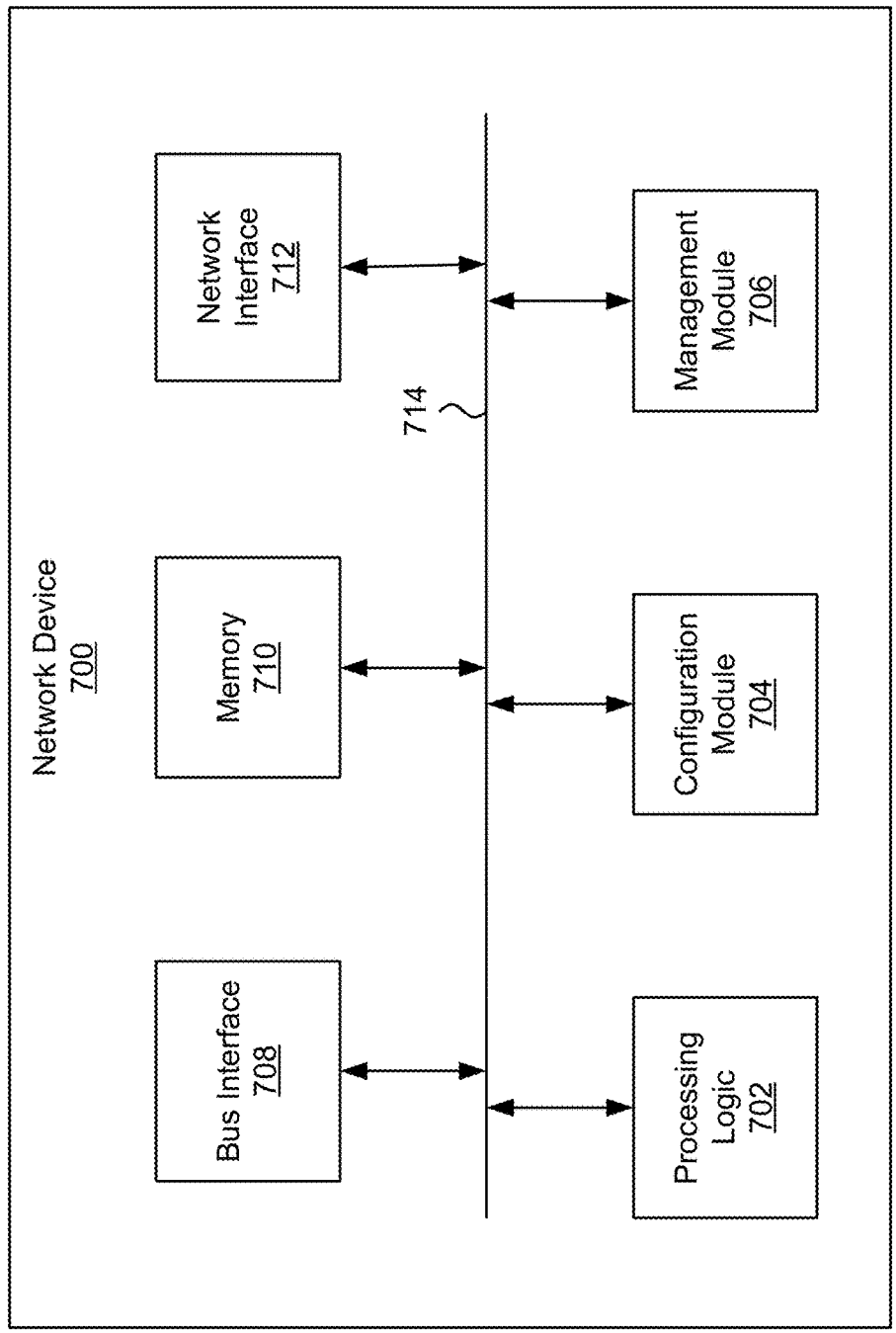
FIG. 7 illustrates an example of a network device, according to certain aspects of the disclosure.

FIG. 7 illustrates an example of a network device 700, which may include a peripheral device as discussed above. Functionality and/or several components of the network device 700 may be used without limitation with other embodiments disclosed elsewhere in this disclosure, without limitations. A network device 700 may facilitate processing of packets and/or forwarding of packets from the network device 700 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 700 may be the recipient and/or generator of packets. In some implementations, the network device 700 may modify the contents of the packet before forwarding the packet to another device. The network device 700 may be a peripheral device coupled to another computer device, a switch, a router or any other suitable device enabled for receiving and forwarding packets.

In one example, the network device 700 may include processing logic 702, a configuration module 704, a management module 706, a bus interface module 708, memory 710, and a network interface module 712. These modules may be hardware modules, software modules, or a combination of hardware and software. In certain instances, modules may be interchangeably used with components or engines, without deviating from the scope of the disclosure. The network device 700 may include additional modules, not illustrated here, such as components discussed with respect to the nodes disclosed in FIG. 8. In some implementations, the network device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores, or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the network device 700, while in other cases some or all of the memory may be external to the network device 700. The memory 710 may store an operating system comprising executable instructions that, when executed by the processing logic 702, provides the execution environment for executing instructions providing networking functionality for the network device 700. The memory may also store and maintain several data structures and routing tables for facilitating the functionality of the network device 700.

In some implementations, the configuration module 704 may include one or more configuration registers. Configuration registers may control the operations of the network device 700. In some implementations, one or more bits in the configuration register can represent certain capabilities of the network device 700. Configuration registers may be programmed by instructions executing in the processing logic 702, and/or by an external entity, such as a host device, an operating system executing on a host device, and/or a remote device. The configuration module 704 may further include hardware and/or software that control the operations of the network device 700.

In some implementations, the management module 706 may be configured to manage different components of the network device 700. In some cases, the management module 706 may configure one or more bits in one or more configuration registers at power up, to enable or disable certain capabilities of the network device 700. In certain implementations, the management module 706 may use processing resources from the processing logic 702. In other implementations, the management module 706 may have processing logic similar to the processing logic 702, but segmented away or implemented on a different power plane than the processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the network device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 700 may include multiple network interface modules, each configured to communicate with a different network. For example, in these implementations, the network device 700 may include a network interface module for communicating with a wired Ethernet network, a wireless 802.11 network, a cellular network, an Infiniband network, etc.

The various components and modules of the network device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 8.

Figure 8:
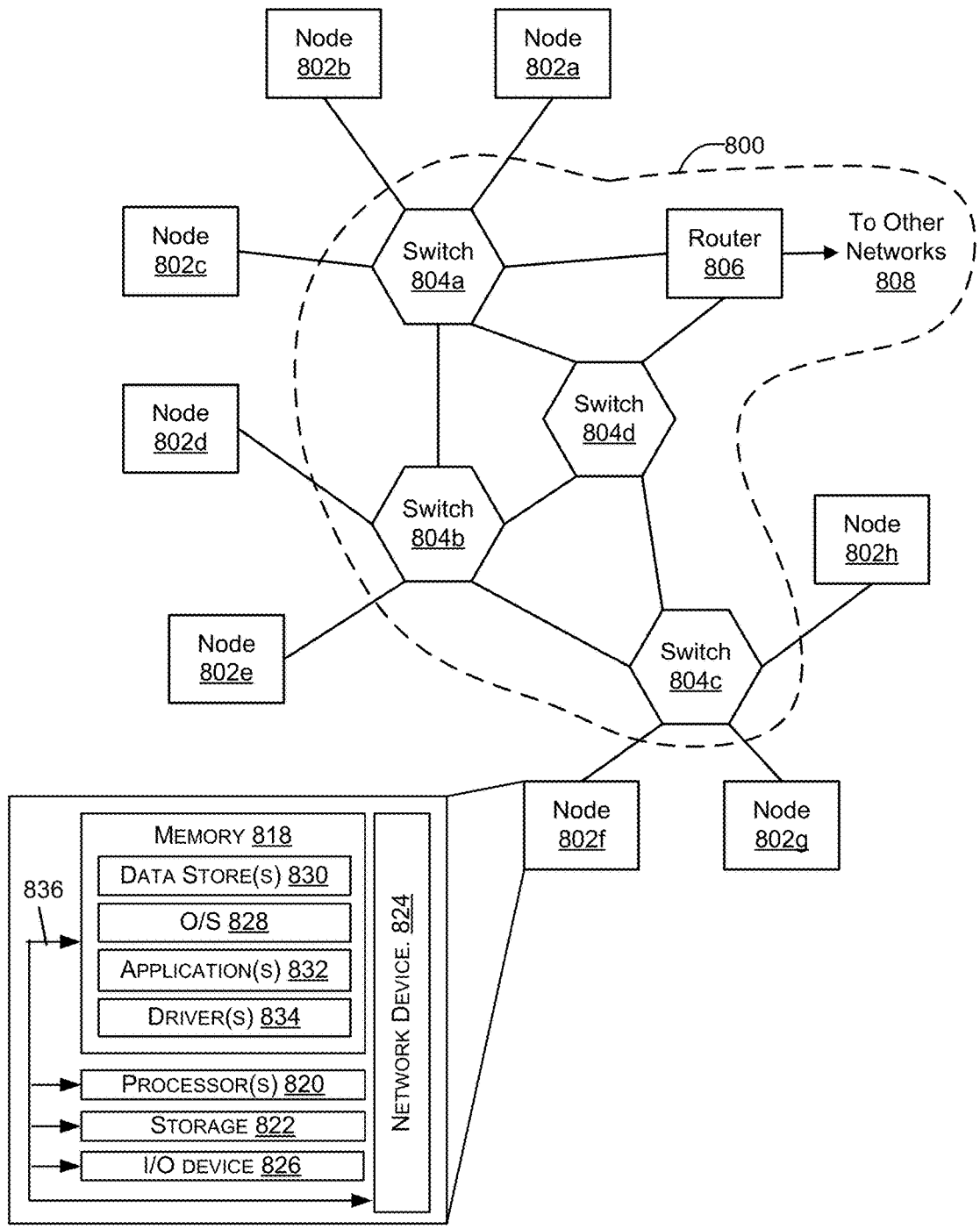
FIG. 8 illustrates an example architecture for features and systems described herein that includes one or more service provider computers and/or a user device connected via one or more networks, according to certain aspects of the disclosure.

FIG. 8 illustrates a network 800, illustrating various different types of network devices 700 of FIG. 7, such as nodes comprising the network device, switches and routers. In certain embodiments, the network 800 may be based on a switched architecture with point-to-point links. As illustrated in FIG. 8, the network 800 includes a plurality of switches 804a-804d, which may be arranged in a network. In some cases, the switches are arranged in a multi-layered network, such as a Clos network. A network device 700 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804a-804d may be connected to a plurality of nodes 802a-802h and provide multiple paths between any two nodes.

The network 800 may also include one or more network devices 700 for connection with other networks 808, such as other subnets, LANs, wide area networks (WANs), or the Internet, and may be referred to as routers 806. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804a-804d and router 806, if present, may be referred to as a switch fabric, a fabric, a network fabric, or simply a network. In the context of a computer network, terms "fabric" and "network" may be used interchangeably herein.

Nodes 802a-802h may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking, and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802a-802h may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some embodiments, the multi-core processors may share certain resources, such as busses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802a-802h, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802a-802h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices 804. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802a-802h or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules, or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800. The network device(s) 824 of FIG. 8 may include similar components discussed with reference to the network device 700 of FIG. 7.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 708 may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules, or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7, FIG. 8, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A Peripheral Component Interconnect (PCI)-based device, comprising:
   a PCI-based bus interface configured to communicate with a host;
   a first processor configured to:
      determine that the first processor is idle at a first power level, wherein the first processor is idle when the first processor is not executing a transaction received from the host and no transactions to be executed by the first processor have been received from the host by the PCI-based device for a pre-determined amount of time; and
      initiate a low-power mode, wherein the low-power mode is a second power level lower than the first power level, wherein initiating the low-power mode includes executing a wait-for-event instruction, and wherein the first processor suspends executing instructions at a point in the instructions at which the first processor executed the wait-for-event instruction; and
   a management circuit configured to:
      receive a next transaction from the host using the PCI-based bus interface;
      log the next transaction, wherein logging the next transaction includes storing the next transaction for executing by the PCI-based device;
      determine that the next transaction is to be executed by the first processor; and
      signal an event to the first processor, wherein signaling the event causes the first processor to exit low-power mode, resume executing instructions from the point at which the first processor suspended executing instructions, and execute the next transaction.

2. The PCI-based device of claim 1, further comprising a second processor, and wherein the processor is further configured to:
   determine, after executing the next transaction, that the first processor is idle;
   initiate the low-power mode;
   subsequent to initiating the low-power mode, receive a signal indicating a second event, wherein the second event indicates that the second processor requires the first processor; and
   exit the low-power mode and resume executing instructions, wherein executing instructions includes communicating with the second processor.

3. The PCI-based device of claim 1, wherein the processor is further configured to:
   determine, after executing the transaction, that the first processor is idle;
   initiate the low-power mode;

receive a second signal indicating a second event, wherein the second event indicates that an interrupt is pending for the first processor; and exit the low-power mode and resume executing instructions, wherein executing instructions includes executing instructions for an interrupt handling routine.

4. The PCI-based device of claim 1, wherein the first processor includes multiple processing cores, wherein initiating the low-power mode includes initiating the low-power mode for a first processing core from the multiple processing cores, and wherein, when the first processing core is in low power mode, the multiple processing cores other than the first processing core remain active.

5. A peripheral device, comprising:
a bus interface;
an integrated circuit device configured to receive transactions from the bus interface; and
a first processor, wherein the first processor includes an interrupt input and an event input, wherein the first processor is configured to execute a sequence of instructions, and wherein the sequence of instructions include:
  instructions that determine that the first processor is idle at a first power level; and
  a wait-for-event instruction, wherein the wait-for-event instruction is called when the first processor determines that the first processor is idle, wherein the wait-for-event instruction initiates a low-power mode for the first processor, wherein the low-power mode is a second power level lower than the first power level, and wherein the first processor suspends executing the sequence of instructions at a point in the sequence of instructions at which the first processor executed the wait-for-event instruction; and
wherein the first processor is configured to receive, at the event input, an event signal from the integrated circuit device, wherein the event signal causes the first processor to exit the low-power mode and to resume executing the sequence of instructions from the point at which the first processor suspended executing the sequence of instructions.

6. The peripheral device of claim 5, wherein the first processor is idle when the first processor is not executing a transaction and no transactions to be executed by the first processor have been received for a predetermined amount of time.

7. The peripheral device of claim 5, wherein the event signal indicates that a transaction has been received over the bus interface, and wherein the transaction is to be executed by the first processor that is in low-power mode.

8. The peripheral device of claim 5, further comprising a second processor, and wherein, subsequent to resuming executing the sequence of instructions, the first processor:
  executes the instructions that determine that the first processor is idle; and
  executes a second wait-for-event instruction, wherein the first processor suspends executing the sequence of instructions at a second point in the sequence of instructions at which the first processor executed the second wait-for-event instruction; and
  wherein the first processor is configured to receive a set-event instruction from the second processor, and wherein the set-event instruction causes the first processor to exit the low-power mode and to resume executing the sequence of instructions from the second point at which the first processor suspended executing the sequence of instructions.

9. The peripheral device of claim 5, wherein, subsequent to resuming executing the sequence of instructions, the first processor:
  executes the instructions that determine that the first processor is idle; and
  executes a second wait-for-event instruction, wherein the first processor suspends executing the sequence of instructions at a second point in the sequence of instructions at which the first processor executed the wait-for-event instruction; and
  wherein the first processor is configured to receive, at the interrupt input, an interrupt signal, wherein the interrupt signal causes the first processor to exit low-power mode and execute instructions for an interrupt handling routine, wherein the interrupt handling routine includes a set-event instruction, and wherein, upon executing the set-event instruction, the first processor resumes executing the sequence of instructions at the second point at which the first processor suspended executing the sequence of instructions.

10. The peripheral device of claim 5, wherein, when the first processor exits low-power mode, the first processor is configured to read a register, and wherein the register provides information about the event signal.

11. The peripheral device of claim 5, wherein, subsequent to resuming executing the sequence of instructions, the first processor is configured to receive a second event signal, wherein, upon executing the instructions that determine that the first processor is idle, the first processor executes a second wait-for-event instruction, and wherein the first processor is prevented from entering the low-power mode by the second event signal.

12. The peripheral device of claim 11, wherein the second event signal is received at the event input, and where the second event signal indicates that a transaction has been received by the peripheral device, and wherein the transaction is to be executed by the first processor.

13. The peripheral device of claim 11, wherein the second event signal is a set-event instruction from a second processor of the peripheral device.

14. The peripheral device of claim 5, wherein the peripheral device is configured to:
  periodically input a signal to the first processor when the first processor is in low-power mode, wherein the signal causes the first processor to exit low-power mode and to resume executing the sequence of instructions.

15. The peripheral device of claim 14, wherein resuming executing the sequence of instructions includes executing instructions for maintenance, and wherein upon completing the instructions for maintenance, the first processor resumes low-power mode.

16. The peripheral device of claim 5, wherein the peripheral device is a Peripheral Component Interconnect Express (PCIe) Non-Volatile Memory Express (NVMe), network, or storage device.

17. A method, comprising:
determining, by a first processor of a peripheral device, that the processor is idle at a first power level, wherein the processor includes an interrupt input and an event input;
initiating a low-power mode for the first processor, wherein the low-power mode is a second power level lower than the first power level, wherein initiating the low-power mode includes executing a wait-for-event instruction, wherein the first processor suspends executing a sequence of instructions at a point in the sequence of instructions at which the first processor executed the wait-for-event instruction; and receiving, at the event input, an event signal from an integrated circuit device of the peripheral device, wherein the event signal causes the first processor to exit the low-power mode and to resume executing the sequence of instructions from the point at which the first processor suspended executing the sequence of instructions.

18. The method of claim 17, wherein the event signal indicates that a transaction that is to be executed by the first processor has been received by the peripheral device.

19. The method of claim 17, further comprising:

subsequent to resuming executing the sequence of instructions, executing instructions that determine that the first processor is idle;

executing a second wait-for-event instruction, wherein the first processor suspends executing the sequence of instructions at a second point in the sequence of instructions at which the first processor executed the second wait-for-event instruction; and receiving a set-event instruction from a second processor of the peripheral device, wherein the set-event instruction causes the first processor to exit the low-power mode and to resume executing the sequence of instructions from the second point at which the first processor suspended executing the sequence of instructions.

20. The method of claim 17, further comprising:

subsequent to resuming executing the sequence of instructions, executing instructions that determine that the first processor is idle;

executing a second wait-for-event instruction, wherein the first processor suspends executing the sequence of instructions at a second point in the sequence of instructions at which the first processor executed the second wait-for-event instruction; and receiving an interrupt signal at the interrupt input, wherein the interrupt signal causes the first processor to exit the low-power mode and execute instructions for an interrupt handling routine, wherein the interrupt handling routine includes a set-event instruction, and wherein, upon executing the set-event instruction, the first processor resumes executing the sequence of instructions at the second point at which the first processor suspended executing the sequence of instructions.

21. The method of claim 17, further comprising:

subsequent to resuming executing the sequence of instructions, receiving a second event signal, wherein, upon executing instructions that determine that the first processor is idle, the first processor executes a second wait-for-event instruction, and wherein the first processor is prevented from entering the low-power mode by the second event signal.

22. The method of claim 17, further comprising:

periodically inputting a signal to the first processor when the first processor is in the low-power mode, wherein the signal causes the first processor to exit the low-power mode and to resume executing instructions.

* * * * *